Figure 2B:
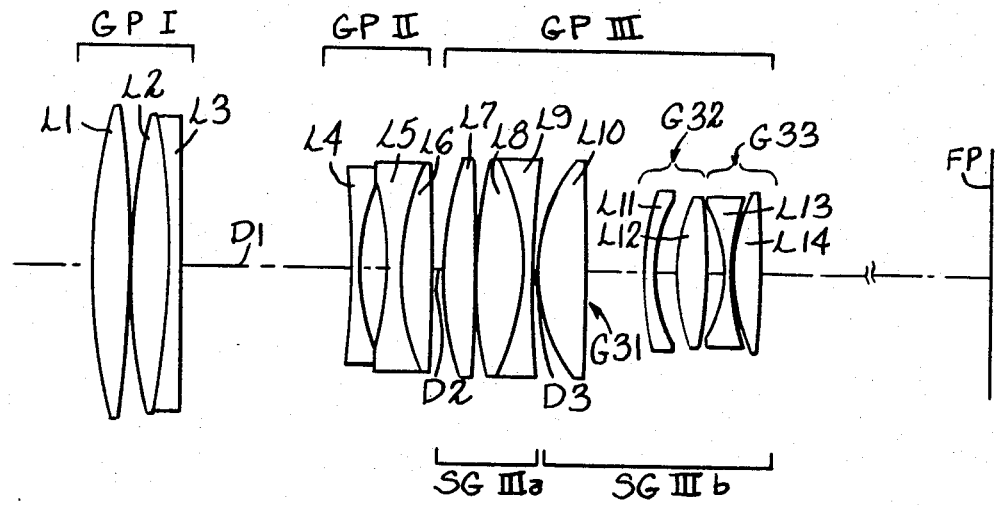

United States Patent [19]

Moskovich

[11] Patent Number: 4,462,664

[45] Date of Patent: Jul. 31, 1984

[54] ZOOM LENS

[75] Inventor: Jacob Moskovich, Cincinnati, Ohio

[73] Assignee: Vivitar Corporation, Santa Monica, Calif.

[21] Appl. No.: 189,591

[22] Filed: Oct. 1, 1980

Related U.S. Application Data

[63] Continuation-in-part of Ser. No. 82,010, Oct. 5, 1979, abandoned.

[51] Int. Cl.³ ............................................. G02B 15/18
[52] U.S. Cl. .................................................. 350/427
[58] Field of Search ........................................ 350/427

[56] References Cited

U.S. PATENT DOCUMENTS 2,847,907  8/1958  Angenieux .................... 350/427

Primary Examiner—John K. Corbin
Assistant Examiner—Rebecca D. Gass
Attorney, Agent, or Firm—Costas, Montgomery & Dorman

[57] ABSTRACT

A zoom lens having a large zoom ratio and capable of close focusing comprising a first positive grouping movable axially for focusing, a second negative grouping, and a third positive grouping movable simultaneously with the second grouping, but in opposite directions to vary the equivalent focal length of the lens. The third grouping may have sub-groupings movable at different rates in the same direction.

37 Claims, 20 Drawing Figures

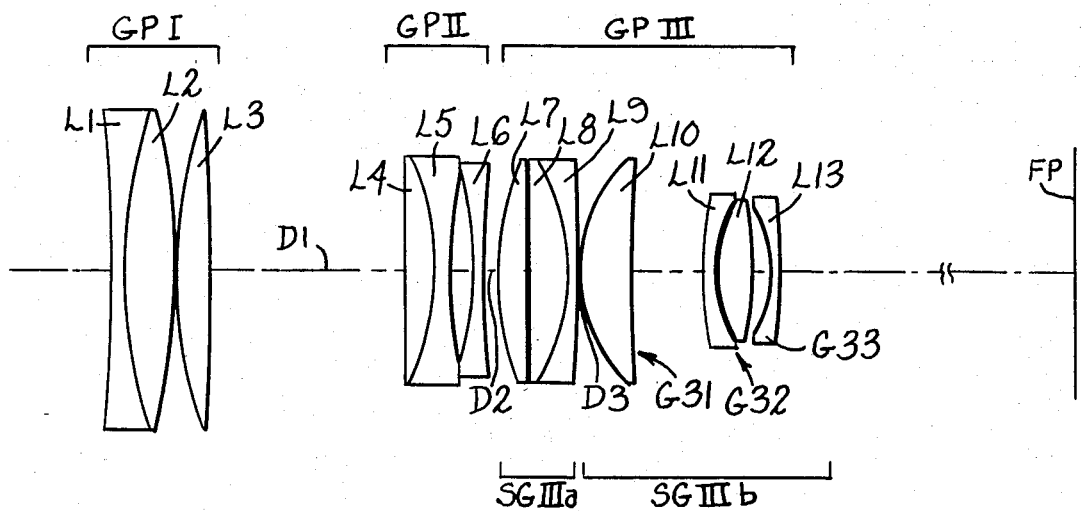
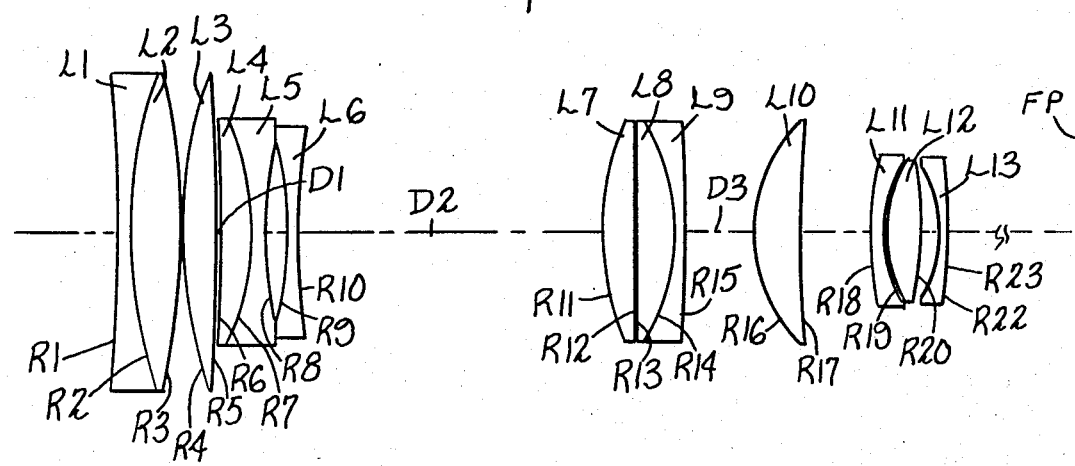

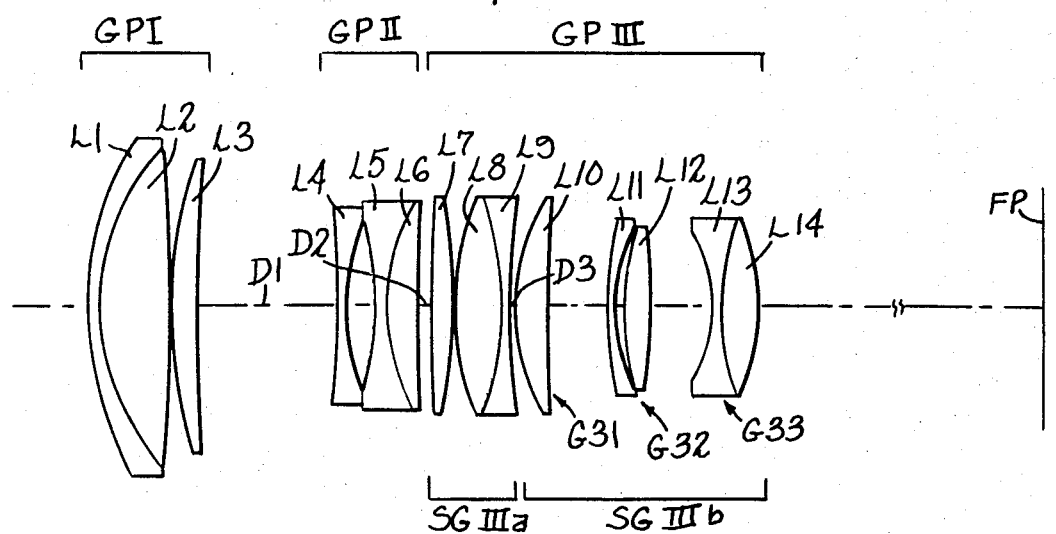
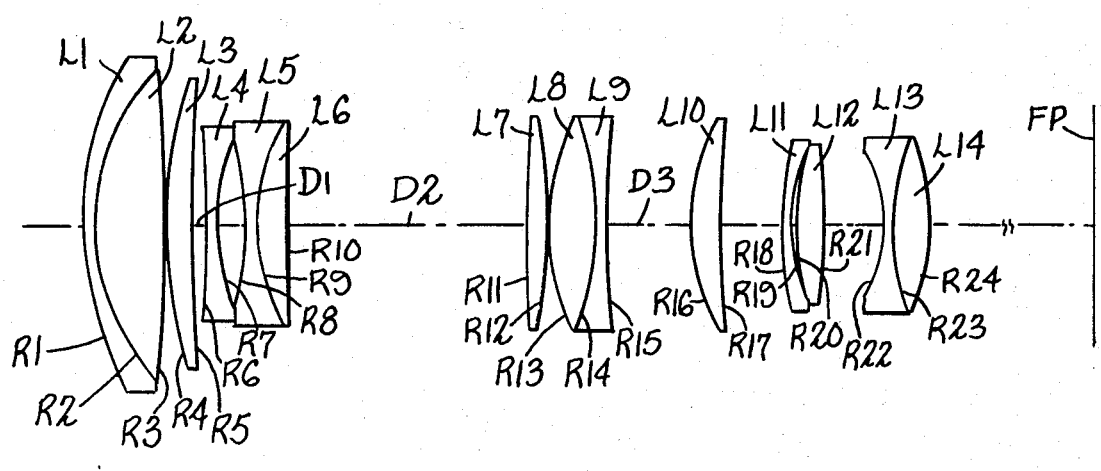

ZOOM LENS

This application is a continuation-in-part of application Ser. No. 82,010 filed Oct. 5, 1979, now abandoned.

This invention relates to zoom lenses for photographic purposes and more particularly relates to a relatively compact zoom lens having a zoom ratio of substantially five to one which is useful in still photography as well as motion photography.

Photographic lenses having the above-stated zoom range typically suffer from excessive size, weight, and complexity which make these lenses impractical for use in what is commonly referred to as 35 mm photography; that is, an image frame of 24×36 mm.

Many examples of zoom lenses covering a normal to telephoto range are disclosed in the prior art. Most of these are of the mechanically compensated type with two moving groups. A maximum zoom ratio usually attainable in such a lens of reasonably small size is a three to one. However, once the zoom ratio extends over a three to one range, the front vertex distance of the lens as well as the diameter thereof begins to grow very quickly with increased zoom ratio. In the case of most lenses, compromise is achieved between the optical performance of the lens and its physical characteristics.

There have been attempts to provide zoom lenses having a large zoom ratio and a small relative aperture. However, none of them is really a compact lens allowing for convenient handling and operation.

Reducing the overall length of the lens usually requires increasing the power of the zooming and stationary groups in the lens. This consequently leads to increased surface aberrational contributions and adversely affects the performance and manufacturability of the lens. The faster the lens, that is, the lower the relative aperture, the more difficult it is to reduce its size because of increased surface aberrational contributions produced by the large apertures. The optical designer has to be very careful not to design a lens of theoretically high optical capability which will be impossible to produce economically because of sensitivity to manufacturing variations.

The relative aperture of the lens is commonly designated by the ratio of the equivalent focal length (EFL) of the lens to the diameter of the entrance pupil of this lens. It is well known that if the location of the aperture stop of the lens is allowed to move axially with change of EFL, such construction can help to reduce the size of the front group by altering the location of the entrance pupil of the lens as a function of EFL, and still allow for a reasonably high speed of the lens.

Accordingly, the present invention provides a new and improved zoom lens design of large zooming ratio while maintaining a relatively small absolute diameter and a short front vertex distance (FVD). Briefly stated, a zoom lens embodying the invention comprises three lens groupings. The first or front lens grouping is of positive optical power and is used for focusing by limited axial movement thereof. However, it is not moved axially in the zooming mode. A second movable group of negative power moves toward the image plane as the focal length is varied from the lower value to the upper value. A third group of positive power moves in the direction opposite to the motion of the second group during zooming. The aperture stop is located within this third movable group and for simplicity of mechanical construction of the lens may move together with the grouping as a whole. Further, in accordance with the invention, the third grouping can be further divided into two sub-groupings, both the first and second sub-groupings being of positive power. The rear sub-grouping achieves a favorable balance of aberration correction while maintaining minimum size and weight of the lens by having a ratio of front vertex distance (FVD) to equivalent focal length (EFL) between 0.75 and 1.4 and is comprised of three groups, positive, positive, and negative.

The various groups and groupings of the lens also have certain optical relationships as hereinafter pointed out.

Lenses embodying the invention may have zooming ranges of substantially five to one, with semi-field angles of about 26° at the lower EFL ranging to less than 6° in the extreme telephoto position. For 35 mm photography, this will provide a lens with a rated EFL range of 40–200 mm.

An object of this invention is to provide a new and improved relatively compact zom lens having an increased zoom ratio.

Another object of this invention is to provide a new and improved zoom lens of increased zoom ratio having a capability for very close focusing at any EFL by movement of only a front focusing group.

A further object of this invention is to provide a new and improved zoom lens having a wide range of equivalent focal lengths and relatively fast speeds.

The features of the invention which are believed to be novel are particularly pointed out and distinctly claimed in the concluding portion of this specification. However, the invention both as to its organization and operation together with further objects and advantages thereof may best be appreciated by reference to the following detailed description taken in conjunction with the drawings, in which:

FIGS. 1a–1b, 2a–2b, 3a–3b, 4a–4b, 5a–5b, 6a–6b, 7a–7b, 8a–8b, 9a–9b and 10a–10b are diagrammatic views of lenses embodying the invention where each lens is shown in different operating position in each pair of figures related by the same numeral.

A lens embodying the invention may be considered to have three major groupings, GPI, GPII, and GPIII. Grouping GPIII will be described as having sub-groupings SGIIIa and SGIIIb. Within sub-grouping SGIIIb will be described a lens comprised of three groups G31, G32, and G33 which are of positive, positive, negative power, successively from the object to image side.

All elements of a lens are identified by the reference L followed by successive numerals from the object end to the image end. All radii of the lens elements are from a point on the optical axis A of a lens and are identified by the reference R followed by successive numerals from the first object end lens surface to the last image end lens surface. The radii are positive when struck from the right and negative when struck from the left.

The spacings D1, D2, and D3 in the drawings are the spacings which vary in axial dimension as the lens groupings move during a change in EFL. FP indicates the focal or image plane of the lens.

Each lens is shown in its minimum EFL position by a figure number followed by (a), and its maximum EFL position by a figure number followed by (b).

A lens embodying the invention, as shown in FIGS. 1a and 1b, comprises a first grouping GPI of positive power which is movable for focusing, but stationary during zooming and comprises elements L1, L2, and L3; a second negative grouping GPII of negative power which moves toward the image plane as the equivalent focal length of the lens is increased and comprises elements L4, L5, and L6; and a third positive grouping GPIII which moves toward the object as the equivalent focal length is increased, and comprises elements L7-L13.

L1, a bi-concave element, and L2, a bi-convex element form a doublet of overall negative power due to the large index of refraction of L1. L3, a bi-convex element, renders GPI of overall positive power.

Elements L4 and L5 are a doublet of overall negative power with L5 bi-concave. Grouping GPII further includes bi-concave element L6.

In the examples and FIGS. 1a and 1b, Grouping GPIII comprises two sub-groupings SGIIIa and SGIIIb. Sub-grouping SGIIIa is of positive power comprising a positive element L7 convex to the object with a large image side radius surface, and a very weak doublet L8, L9. Sub-grouping SGIIIb comprises a positive group G31 in the form of an element having a convex object side surface and an image side surface of much greater radius; a positive group G32 comprising elements L11 and L12; and a negative group G33 in the form of a negative meniscus L13, concave to the object.

To maintain the compact size and yet to allow for reasonably loose tolerances in manufacturing of this lens, the power of the sub-grouping SGIIIb should satisfy the following condition:

$$0.75 < \frac{FVD_{IIIb}}{f_{IIIb}} < 1.4$$

Front vertex distance of $FVD_{IIIb}$ refers to the distance of the first object side surface of the rear sub-grouping SGIIIb to the focal plane when this subgrouping alone is focused at infinity.

If the upper limit is increased, the size of the lens becomes too big to allow for a compact, easy-to-handle package. On another hand, when the above-mentioned ratio becomes smaller than the lower limit, then the individual lens elements become very sensitive to manufacturing variations leading to increased difficulties producing the lens.

To achieve a favorable balance of aberrations, the sub-grouping SGIIIb is comprised of three groups G31, G32, and G33 of positive, positive, and negative optical power wherein the last group has meniscus shape concave towards the object.

Group G32 generally serves as an aberration corrector and may have a wide range of powers as hereinafter made apparent. Also, the absolute ratio of the power of groups G31 to G33 is of importance, as hereinafter pointed out.

FIGS. 1a and 1b illustrate a lens embodying the invention at its extreme lower and upper equivalent focal lengths respectively. The axial spaces D1, D2, and D3 vary to change the EFL as hereinafter stated.

A lens as shown in FIGS. 1a and 1b, which has a zoom range to subtend semi-field angles of 22.8° to 6.3°, as scaled to an image frame of 24 mm × 36 mm, and an EFL of 51.5 mm to 195 mm is set forth in Table I. BFL is the back focal length.

TABLE I

| Element | Radius of Curvature (mm) | Axial Distance Between Surfaces (mm) | Index of Refraction $N_d$ | Abbe No. $V_d$ |
| --- | --- | --- | --- | --- |
| L1 | R1 = −331.909 | 2.000 | 1.847 | 23.8 |
|  | R2 = 77.893 |  |  |  |
| L2 |  | 8.325 | 1.531 | 50.9 |
|  | R3 = −105.577 |  |  |  |
|  |  | 0.200 |  |  |
|  | R4 = 75.550 |  |  |  |
| L3 |  | 5.264 | 1.741 | 35.1 |
|  | R5 = −738.126 |  |  |  |
|  |  | 1.000 (D1) |  |  |
|  | R6 = −273.757 |  |  |  |
| L4 |  | 4.990 | 1.847 | 23.8 |
|  | R7 = −39.174 |  |  |  |
| L5 |  | 2.000 | 1.697 | 55.5 |
|  | R8 = 74.538 |  |  |  |
|  |  | 4.086 |  |  |
|  | R9 = −53.121 |  |  |  |
| L6 |  | 1.500 | 1.697 | 55.5 |
|  | R10 = 148.879 |  |  |  |
|  |  | 49.510 (D2) |  |  |
|  | R11 = 46.961 |  |  |  |
| L7 |  | 4.902 | 1.608 | 40.0 |
|  | R12 = −929.669 |  |  |  |
|  |  | 0.200 |  |  |
|  | R13 = 726.860 |  |  |  |
| L8 |  | 6.485 | 1.587 | 51.7 |
|  | R14 = −31.445 |  |  |  |
| L9 |  | 1.500 | 1.847 | 23.8 |
|  | R15 = −260.591 |  |  |  |
|  |  | 10.825 (D3) |  |  |
|  | R16 = 23.960 |  |  |  |
| L10 |  | 8.148 | 1.517 | 69.7 |
|  | R17 = 249.885 |  |  |  |
|  |  | 11.397 |  |  |
|  | R18 = 64.858 |  |  |  |
| L11 |  | 1.500 | 1.804 | 46.5 |
|  | R19 = 16.770 |  |  |  |
|  |  | 0.467 |  |  |
|  | R20 = 18.004 |  |  |  |
| L12 |  | 6.440 | 1.648 | 33.8 |
|  | R21 = −46.653 |  |  |  |
|  |  | 2.692 |  |  |
|  | R22 = −18.862 |  |  |  |
| L13 |  | 1.500 | 1.834 | 37.3 |
|  | R23 = −106.740 |  |  |  |
|  | BFL = 40.106 |  |  |  |

In the foregoing Table I, the iris defining the aperture stop is located between elements L6 and L7 and moves with sub-grouping SGIIIa. Positive radii are struck from the right and negative radii are struck from the left.

The spacings of the groupings at different equivalent focal lengths are given below in Table II.

TABLE II

| | EFL | | | |
| --- | --- | --- | --- | --- |
| Spacing | 51.5 mm | 85.00 mm | 135.00 mm | 195.00 mm |
| D1 | 1.000 mm | 15.525 mm | 25.714 mm | 31.992 mm |
| D2 | 49.310 mm | 31.944 mm | 15.651 mm | 2.000 mm |
| D3 | 10.825 mm | 5.460 mm | 2.224 mm | .500 mm |
| f/No. | 2.88 | 3.35 | 3.73 | 4.12 |

The relative aperture as exemplified by f/No. varies from 2.9 at the lower EFL to 4.1 at the higher EFL due to the moving aperture stop, while the iris diameter stays fixed.

Thirteen examples of the invention are disclosed, and for purposes of comparison, the organization of the elements are set forth below.

TABLE III

| TABLE | GPI | GPII | SGIIIa | SGIIIb | G31 | G32 | G33 |
|---|---|---|---|---|---|---|---|
| I | L1-L3 | L4-L6 | L7-L9 | L10-L13 | L10 | L11, L12 | L13 |
| IV & VI | L1-L3 | L4-L6 | L7-L9 | L10-L14 | L10 | L11, L12 | L13, L14 |
| X | L1-L3 | L4-L7 | L8-L10 | L11-L15 | L11 | L12, L13 | L14, L15 |
| VIII | L1-L3 | L4-L6 | L7, L8 | L9-L12 | L9 | L10, L11 | L12 |
| XII & XIV | L1-L3 | L4-L6 | L7-L9 | L10-L14 | L10 | L11, L12 | L13, L14 |
| XVI | L1-L3 | L4-L6 | L7-L9 | L10-L14 | L10 | L11, L12 | L13, L14 |
| XVIII | L1-L3 | L4-L6 | L7-L9 | L10-L13 | L10 | L11, L12 | L13 |
| XX | L1-L3 | L4-L6 | L7-L9 | L10-L14 | L10 | L11, L12 | L13, L14 |
| XXII | L1-L3 | L4-L6 | L7-L10 | L10-L14 | L10 | L11, L12 | L13 |
| XXIV & XXV | L1-L3 | L4-L6 | L7-L9 | L10-L15 | L10, L11 | L12, L13 | L14, L15 |

Figure 2A:
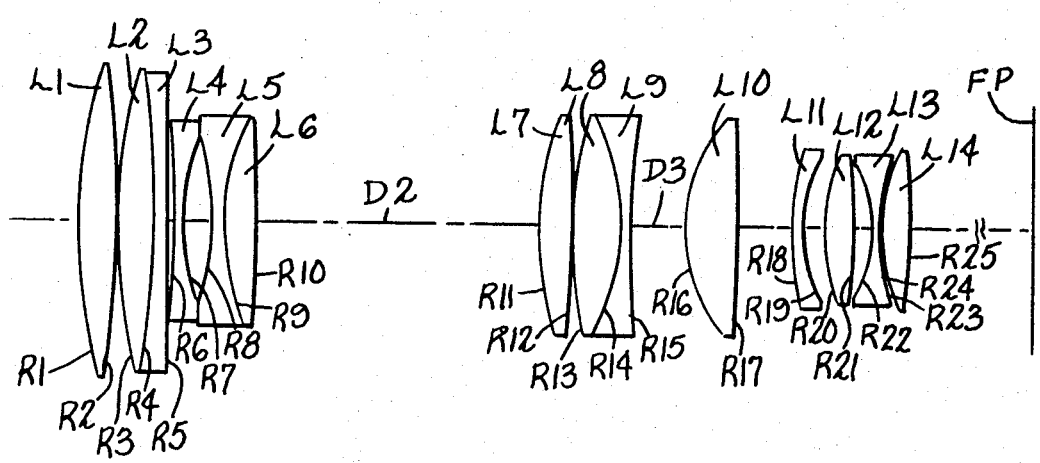

Another embodiment of the invention is set forth in FIGS. 2a and 2b. The structural form of the lenses differs in that grouping GPI has a first bi-convex element L1 followed by a bi-convex doublet L3, L4. Grouping GPII comprises a first bi-concave element L4 followed by a negative doublet L5, L6 with L5 bi-concave. Group G32 comprises a negative meniscus L11 and a spaced bi-convex element L12. Group G33 comprises a bi-concave element L13 and a bi-convex element L14.

The prescriptions of two lenses of this form are set forth in Tables IV and V. In both examples, the lens sub-tends a semi-field angle varying from 22.8° to 6.3°, and is scaled for a 24×36 mm image frame with an EFL range of 51.5 mm to 195.5 mm.

TABLE IV

| Element | Radius of Curvature (mm) | Axial Distance Between Surfaces (mm) | Index of Refraction $N_d$ | Abbe No. $V_d$ |
|---|---|---|---|---|
| L1 | R1 = 91.606 | | | |
|  | | 6.157 | 1.517 | 69.7 |
|  | R2 = −204.977 | | | |
|  | | 0.200 | | |
| L2 | R3 = 99.209 | | | |
|  | | 6.256 | 1.487 | 70.4 |
| L3 | R4 = −121.897 | | | |
|  | | 2.000 | 1.847 | 23.8 |
|  | R5 = −1311.231 | | | |
|  | | 1.000 (D1) | | |
| L4 | R6 = −207.668 | | | |
|  | | 1.500 | 1.713 | 53.9 |
|  | R7 = 39.369 | | | |
|  | | 4.571 | | |
| L5 | R8 = −48.686 | | | |
|  | | 2.000 | 1.697 | 55.5 |
| L6 | R9 = 39.043 | | | |
|  | | 4.988 | 1.847 | 23.8 |
|  | R10 = −564.889 | | | |
|  | | 46.831 (D2) | | |
| L7 | R11 = 54.481 | | | |
|  | | 5.338 | 1.607 | 56.7 |
|  | R12 = −374.746 | | | |
|  | | 0.200 | | |
| L8 | R13 = 77.405 | | | |
|  | | 7.895 | 1.581 | 40.9 |
| L9 | R14 = −36.501 | | | |
|  | | 1.500 | 1.847 | 23.8 |
|  | R15 = 194.707 | | | |
|  | | 9.109 (D3) | | |
| L10 | R16 = 26.911 | | | |
|  | | 8.076 | 1.525 | 60.0 |
|  | R17 = −1041.865 | | | |
|  | | 9.346 | | |

TABLE IV-continued

| Element | Radius of Curvature (mm) | Axial Distance Between Surfaces (mm) | Index of Refraction $N_d$ | Abbe No. $V_d$ |
|---|---|---|---|---|
| L11 | R18 = 52.178 | | | |
|  | | 1.838 | 1.559 | 64.4 |
|  | R19 = 21.897 | | | |
|  | | 3.425 | | |
| L12 | R20 = 28.087 | | | |
|  | | 5.298 | 1.627 | 34.6 |
|  | R21 = −62.138 | | | |
|  | | 2.562 | | |
| L13 | R22 = −23.600 | | | |
|  | | 1.500 | 1.834 | 37.3 |
|  | R23 = 28.021 | | | |
|  | | 0.445 | | |
| L14 | R24 = 28.914 | | | |
|  | | 4.385 | 1.619 | 35.4 |
|  | R25 = −118.264 | | | |
|  | BFL = 38.539 | | | |

TABLE V

| Element | Radius of Curvature (mm) | Axial Distance Between Surfaces (mm) | Index of Refraction $N_d$ | Abbe No. $V_d$ |
|---|---|---|---|---|
| L1 | R1 = 101.687 | | | |
|  | | 7.471 | 1.487 | 70.4 |
|  | R2 = −198.419 | | | |
|  | | 0.200 | | |
| L2 | R3 = 95.447 | | | |
|  | | 7.353 | 1.487 | 70.4 |
| L3 | R4 = −139.520 | | | |
|  | | 2.000 | 1.805 | 25.5 |
|  | R5 = −5325.160 | | | |
|  | | 2.883 (D1) | | |
| L4 | R6 = −190.880 | | | |
|  | | 1.500 | 1.773 | 49.7 |
|  | R7 = 48.001 | | | |
|  | | 5.742 | | |
| L5 | R8 = −58.215 | | | |
|  | | 2.000 | 1.697 | 55.5 |
| L6 | R9 = 42.255 | | | |
|  | | 4.992 | 1.847 | 23.8 |
|  | R10 = 2180.742 | | | |
|  | | 50.035 (D2) | | |
| L7 | R11 = 154.385 | | | |
|  | | 3.104 | 1.847 | 23.8 |
|  | R12 = −536.964 | | | |
|  | | 0.200 | | |
| L8 | R13 = 34.221 | | | |
|  | | 8.851 | 1.487 | 70.4 |
| L9 | R14 = −42.312 | | | |
|  | | 1.500 | 1.805 | 25.5 |
|  | R15 = 124.660 | | | |
|  | | 5.006 (D3) | | |
| L10 | R16 = 27.114 | | | |
|  | | 5.691 | 1.581 | 40.9 |
|  | R17 = 167.817 | | | |
|  | | 6.077 | | |
| L11 | R18 = 35.204 | | | |
|  | | 1.500 | 1.847 | 23.8 |
|  | R19 = 22.920 | | | |
|  | | 1.620 | | |
| L12 | R20 = 36.325 | | | |
|  | | 6.578 | 1.541 | 47.2 |
|  | R21 = −83.500 | | | |
|  | | 8.928 | | |
| L13 | R22 = −18.143 | | | |
|  | | 1.500 | 1.834 | 37.3 |
|  | R23 = 114.343 | | | |
|  | | 0.617 | | |
| L14 | R24 = 278.786 | | | |
|  | | 3.152 | 1.847 | 23.8 |
|  | R25 = −35.211 | | | |
|  | BFL = 38.552 | | | |

In Table IV the iris defining the aperture stop is located between elements L6 and L7, and moves with sub-grouping SGIIIa.

The spacings of the groupings at different equivalent focal lengths are given below in Table VI.

TABLE VI

| | EFL | | | |
|---|---|---|---|---|
| Spacing | 51.5 mm | 85.00 mm | 135.00 mm | 195.00 mm |
| D1 | 1.000 mm | 13.307 mm | 22.522 mm | 27.537 mm |
| D2 | 46.831 mm | 30.407 mm | 14.997 mm | 2.000 mm |
| D3 | 9.109 mm | 4.571 mm | 2.208 mm | .500 mm |
| f/No. | 2.9 | 3.35 | 3.73 | 4.1 |

In Table V, the iris defining the aperture stop is located between elements L10 and L11 and moves with sub-grouping SGIIIb.

The spacings of the groupings at different equivalent focal lengths are given below in Table VII.

TABLE VII

| | EFL | | | |
|---|---|---|---|---|
| Spacing | 51.5 mm | 85.00 mm | 135.00 mm | 195.00 mm |
| D1 | 2.883 mm | 14.285 mm | 23.334 mm | 28.899 mm |
| D2 | 50.035 mm | 31.496 mm | 15.039 mm | 1.000 mm |
| D3 | 5.006 mm | 2.782 mm | .994 mm | .500 mm |
| f/No. | 2.95 | 3.5 | 3.7 | 4.1 |

Figure 3B:
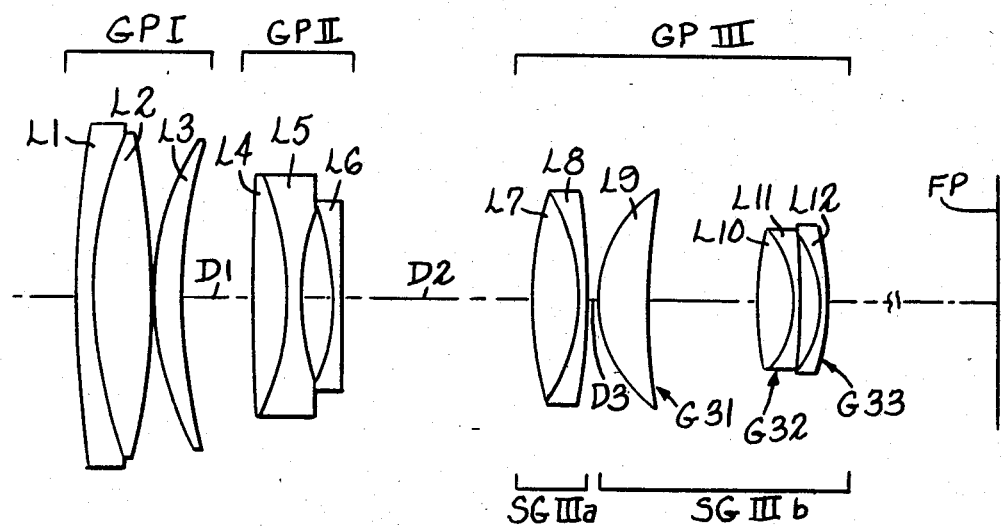
Figure 3A:
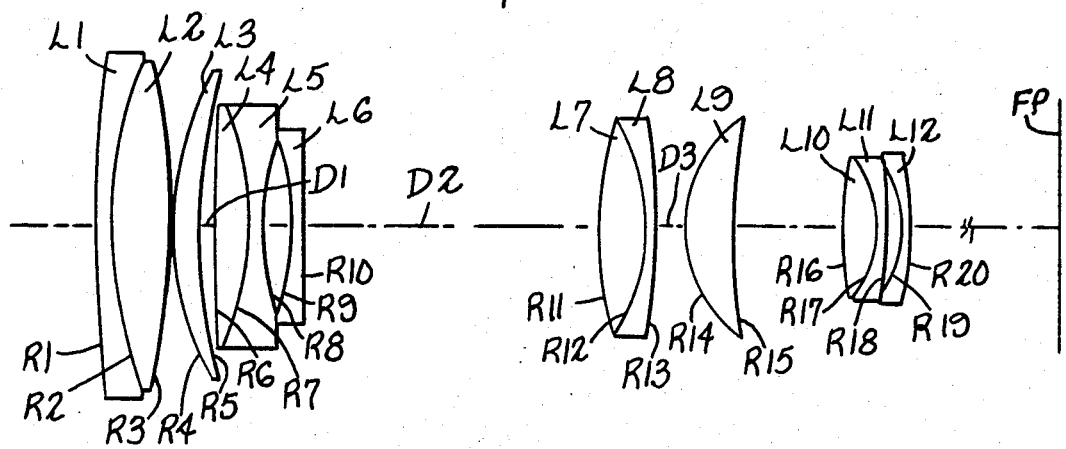

Another embodiment of the invention as shown in FIGS. 3a and 3b utilizes only twelve elements L1–L12. This embodiment differs primarily in that sub-groupings SGIIIa comprises only a bi-convex doublet L7, L8. Also, the forward components L10, L11 of group G3 are a doublet comprising a forward (object side) bi-convex element L10, and a rear meniscus L11. Grouping GPI again comprises three elements, but here in the form of a convex object side meniscus L1 and a bi-convex element L2 forming a doublet, followed by a positive meniscus L3, convex to the object.

The prescription of this lens is set forth in Table VIII. The lens subtends a semi-field angle of 22.8° to 6.3°, and is scaled for an image plane of 24×36 mm with an EFL range of 51.5 mm to 195 mm.

TABLE VIII

| Element | Radius of Curvature (mm) | Axial Distance Between Surfaces (mm) | Index of Refraction $N_d$ | Abbe No. $V_d$ |
|---|---|---|---|---|
| L1 | R1 = 311.481 | | | |
| | | 2.000 | 1.847 | 23.8 |
| | R2 = 68.476 | | | |
| L2 | | 9.718 | 1.589 | 62.6 |
| | R3 = −108.672 | | | |
| | | 0.200 | | |
| | R4 = 50.060 | | | |
| L3 | | 4.222 | 1.690 | 31.0 |
| | R5 = 84.784 | | | |
| | | 2.822 (D1) | | |
| | R6 = 508.164 | | | |
| L4 | | 5.563 | 1.847 | 23.8 |
| | R7 = −47.257 | | | |
| L5 | | 2.000 | 1.696 | 55.1 |
| | R8 = 41.931 | | | |
| | | 5.239 | | |
| | R9 = −38.143 | | | |
| L6 | | 1.500 | 1.711 | 53.9 |
| | R10 = Infinity | | | |
| | | 47.717 (D2) | | |
| | R11 = 59.518 | | | |
| L7 | | 7.648 | 1.571 | 51.1 |
| | R12 = −30.945 | | | |
| L8 | | 1.500 | 1.831 | 24.2 |
| | R13 = −106.827 | | | |
| | | 4.906 (D3) | | |
| | R14 = 22.295 | | | |
| L9 | | 7.351 | 1.487 | 70.4 |
| | R15 = 85.618 | | | |
| | | 18.021 | | |

TABLE VIII-continued

| Element | Radius of Curvature (mm) | Axial Distance Between Surfaces (mm) | Index of Refraction $N_d$ | Abbe No. $V_d$ |
|---|---|---|---|---|
| | R16 = 54.725 | | | |
| L10 | | 5.731 | 1.631 | 34.2 |
| | R17 = −16.627 | | | |
| L11 | | 1.500 | 1.806 | 40.7 |
| | R18 = −68.855 | | | |
| | | 2.363 | | |
| | R19 = −19.620 | | | |
| L12 | | 1.500 | 1.806 | 40.7 |
| | R20 = −53.856 | | | |
| | BFL = 38.547 | | | |

In the foregoing Table VIII, the iris defining the aperture stop is located between elements L6 and L7. Positive radii are struck from the right and negative radii are struck from the left.

The spacings of the groupings at different equivalent focal lengths are given below in Table IX.

TABLE IX

| | EFL | | | |
|---|---|---|---|---|
| Spacing | 51.5 mm | 85.00 mm | 135.00 mm | 195.00 mm |
| D1 | 2.822 mm | 12.015 mm | 25.282 mm | 29.739 mm |
| D2 | 47.717 mm | 30.486 mm | 15.603 mm | 2.000 mm |
| D3 | 4.906 mm | 1.699 mm | .788 mm | .500 mm |
| f/No. | 2.8 | 3.3 | 3.6 | 4.0 |

Figure 4B:
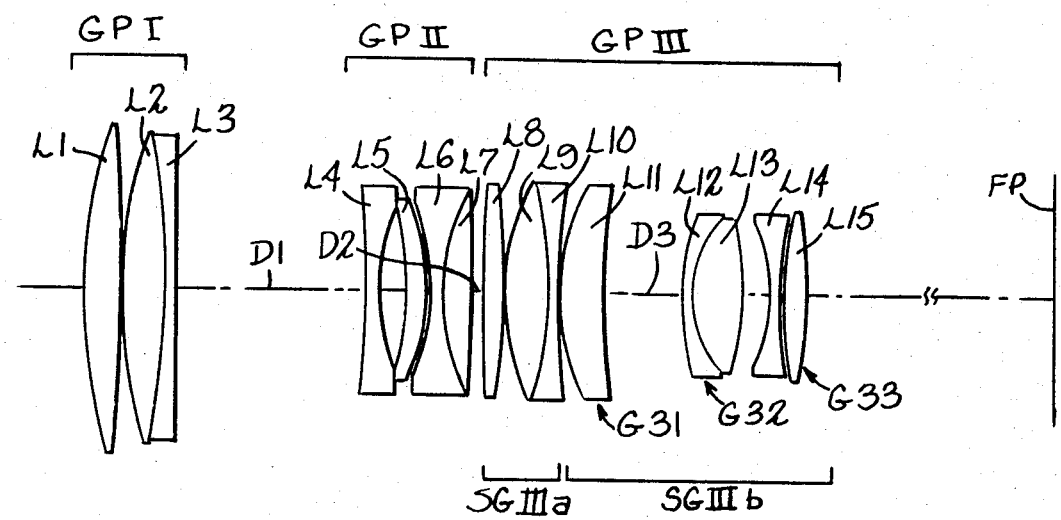
Figure 4A:
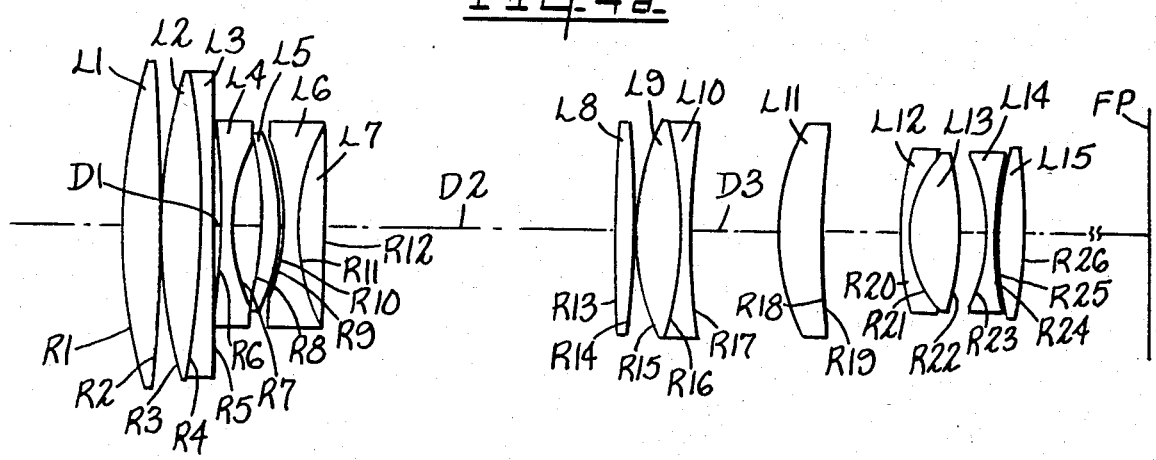

FIGS. 4a and 4b disclose an embodiment of the invention where the grouping GPI takes the same form as in FIGS. 2a–2b. However, grouping GPII includes a positive meniscus L5 behind the bi-concave element L4. Group G32 of sub-grouping SGIIIb comprises a bi-convex doublet L12, L13 followed by bi-concave element L14 and bi-convex element L15 of overall combined negative power.

This lens as further set forth in Table X has a lower EFL which is less than the diagonal of the image frame. The lens subtends semi-field angles of 27.8° to 6.3°, and is scaled for a 24×36 mm image frame, with an EFL range of 41.00 mm to 195.00 mm.

TABLE X

| Element | Radius of Curvature (mm) | Axial Distance Between Surfaces (mm) | Index of Refraction $N_d$ | Abbe No. $V_d$ |
|---|---|---|---|---|
| L1 | R1 = 87.088 | | | |
| | | 6.073 | 1.487 | 70.4 |
| | R2 = −357.220 | | | |
| | | 0.200 | | |
| L2 | R3 = 81.894 | | | |
| | | 6.904 | 1.517 | 69.7 |
| | R4 = −113.558 | | | |
| L3 | | 2.000 | 1.805 | 25.5 |
| | R5 = −741.212 | | | |
| | | 1.000 (D1) | | |
| | R6 = −145.203 | | | |
| L4 | | 2.000 | 1.850 | 32.2 |
| | R7 = 29.227 | | | |
| | | 5.027 | | |
| | R8 = −40.720 | | | |
| L5 | | 3.218 | 1.617 | 36.6 |
| | R9 = −28.743 | | | |
| | | 0.329 | | |
| | R10 = −34.696 | | | |
| L6 | | 2.000 | 1.620 | 60.3 |
| | R11 = 30.644 | | | |
| L7 | | 4.602 | 1.847 | 23.8 |
| | R12 = −836.811 | | | |
| | | 47.970 (D2) | | |
| | R13 = 244.236 | | | |
| L8 | | 3.347 | 1.847 | 23.8 |
| | R14 = −159.720 | | | |

TABLE X-continued

| Element | Radius of Curvature (mm) | Axial Distance Between Surfaces (mm) | Index of Refraction $N_d$ | Abbe No. $V_d$ |
|---|---|---|---|---|
| | | 0.200 | | |
| | R15 = 37.449 | | | |
| L9 | | 7.464 | 1.487 | 70.4 |
| | R16 = −59.792 | | | |
| L10 | | 1.500 | 1.847 | 23.8 |
| | R17 = 128.574 | | | |
| | | 14.245 (D3) | | |
| | R18 = 34.377 | | | |
| L11 | | 7.312 | 1.694 | 53.3 |
| | R19 = 125.375 | | | |
| | | 12.722 | | |
| | R20 = 40.777 | | | |
| L12 | | 1.500 | 1.834 | 37.3 |
| | R21 = 17.194 | | | |
| L13 | | 8.377 | 1.529 | 51.6 |
| | R22 = −45.367 | | | |
| | | 4.500 | | |
| | R23 = −23.943 | | | |
| L14 | | 1.500 | 1.850 | 32.2 |
| | R24 = 50.260 | | | |
| | | 0.724 | | |
| | R25 = 56.060 | | | |
| L15 | | 3.971 | 1.847 | 23.8 |
| | R26 = −75.126 | | | |
| | BFL = 38.556 | | | |

In the foregoing Table X, the iris defining the aperture stop is located between elements L7 and L8 and moves with sub-grouping SGIIIa. Positive radii are struck from the right and negative radii are struck from the left.

The variable spacings of the groupings at different equivalent focal lengths are given below in Table XI.

TABLE XI

| | EFL | | | |
|---|---|---|---|---|
| Spacing | 41.0 mm | 85.00 mm | 135.00 mm | 195.00 mm |
| D1 | 1.000 mm | 17.567 mm | 26.928 mm | 31.136 mm |
| D2 | 47.970 mm | 26.960 mm | 13.815 mm | 2.000 mm |
| D3 | 14.245 mm | 4.978 mm | 2.626 mm | .500 mm |
| f/No. | 2.95 | 3.5 | 3.7 | 4.1 |

FIGS. 5a and 5b illustrate another lens embodying the invention where GP1 comprises a bi-convex doublet L1, L2 with L1 being a negative meniscus, and L2 is a positive with its shortest radius being convex to the object. Group G32 comprises a negative meniscus L11, and a bi-convex element L12 of overall positive power. Group G33 is a doublet comprising a bi-concave element L13 and a bi-convex element L14 of overall negative power.

Prescriptions of two lenses of this form are set forth in Tables XII and XIII. Both lenses subtend semi-field angles of 22.8° to 6.3°, and are scaled to an image frame of 24×36 mm, with an EFL range of 51.5 mm to 195.0 mm.

TABLE XII

| Element | Radius of Curvature (mm) | Axial Distance Between Surfaces (mm) | Index of Refraction $N_d$ | Abbe No. $V_d$ |
|---|---|---|---|---|
| | R1 = 51.685 | | | |
| L1 | | 2.000 | 1.728 | 28.7 |
| | R2 = 35.419 | | | |
| L2 | | 11.322 | 1.487 | 70.4 |
| | R3 = −300.792 | | | |
| | | 0.200 | | |
| | R4 = 70.392 | | | |
| L3 | | 4.236 | 1.487 | 70.4 |
| | R5 = 260.451 | | | |

TABLE XII-continued

| Element | Radius of Curvature (mm) | Axial Distance Between Surfaces (mm) | Index of Refraction $N_d$ | Abbe No. $V_d$ |
|---|---|---|---|---|
| | | 2.174 (D1) | | |
| | R6 = −218.893 | | | |
| L4 | | 1.500 | 1.773 | 49.6 |
| | R7 = 33.369 | | | |
| | | 5.032 | | |
| | R8 = −50.332 | | | |
| L5 | | 1.500 | 1.697 | 55.5 |
| | R9 = 29.315 | | | |
| L6 | | 5.544 | 1.847 | 23.8 |
| | R10 = 372.944 | | | |
| | | 39.191 (D2) | | |
| | R11 = 278.949 | | | |
| L7 | | 3.349 | 1.785 | 25.7 |
| | R12 = −112.134 | | | |
| | | 0.200 | | |
| | R13 = 37.648 | | | |
| L8 | | 8.126 | 1.487 | 70.4 |
| | R14 = −46.741 | | | |
| L9 | | 1.500 | 1.728 | 28.7 |
| | R15 = 130.107 | | | |
| | | 12.937 (D3) | | |
| | R16 = 30.554 | | | |
| L10 | | 5.344 | 1.589 | 61.3 |
| | R17 = 161.993 | | | |
| | | 9.765 | | |
| | R18 = 53.104 | | | |
| L11 | | 1.500 | 1.805 | 25.5 |
| | R19 = 26.732 | | | |
| | | 0.998 | | |
| | R20 = 35.956 | | | |
| L12 | | 4.621 | 1.603 | 60.7 |
| | R21 = −86.528 | | | |
| | | 10.000 | | |
| | R22 = −20.688 | | | |
| L13 | | 1.200 | 1.773 | 49.6 |
| | R23 = 36.746 | | | |
| L14 | | 6.262 | 1.673 | 32.2 |
| | R24 = −36.746 | | | |
| | BFL = 38.550 | | | |

TABLE XIII

| Element | Radius of Curvature (mm) | Axial Distance Between Surfaces (mm) | Index of Refraction $N_d$ | Abbe No. $V_d$ |
|---|---|---|---|---|
| | R1 = 100.000 | | | |
| L1 | | 2.000 | 1.847 | 23.8 |
| | R2 = 61.777 | | | |
| L2 | | 8.540 | 1.487 | 70.4 |
| | R3 = −139.015 | | | |
| | | 0.200 | | |
| | R4 = 57.007 | | | |
| L3 | | 4.333 | 1.487 | 70.4 |
| | R5 = 141.831 | | | |
| | | 1.774 (D1) | | |
| | R6 = −219.606 | | | |
| L4 | | 1.500 | 1.773 | 49.7 |
| | R7 = 42.712 | | | |
| | | 4.608 | | |
| | R8 = −50.056 | | | |
| L5 | | 2.000 | 1.697 | 55.5 |
| | R9 = 39.784 | | | |
| L6 | | 4.992 | 1.847 | 23.8 |
| | R10 = −1453.300 | | | |
| | | 47.246 (D2) | | |
| | R11 = 93.289 | | | |
| L7 | | 3.836 | 1.805 | 25.5 |
| | R12 = −218.835 | | | |
| | | 0.200 | | |
| | R13 = 37.170 | | | |
| L8 | | 7.645 | 1.487 | 70.4 |
| | R15 = −60.263 | | | |
| L9 | | 1.500 | 1.847 | 23.8 |
| | R15 = 74.160 | | | |
| | | 8.989 (D3) | | |
| | R16 = 28.233 | | | |
| L10 | | 5.691 | 1.583 | 45.7 |

TABLE XIII-continued

| Element | Radius of Curvature (mm) | Axial Distance Between Surfaces (mm) | Index of Refraction $N_d$ | Abbe No. $V_d$ |
|---|---|---|---|---|
| | R17 = 161.805 | | | |
| | | 8.196 | | |
| | R18 = 41.946 | | | |
| L11 | | 1.500 | 1.847 | 23.8 |
| | R19 = 23.983 | | | |
| | | 1.133 | | |
| | R20 = 33.166 | | | |
| L12 | | 4.571 | 1.532 | 48.8 |
| | R21 = −115.744 | | | |
| | | 11.000 | | |
| | R22 = −18.977 | | | |
| L13 | | 1.500 | 1.834 | 37.3 |
| | R23 = 73.633 | | | |
| | | 0.505 | | |
| | R24 = 94.636 | | | |
| L14 | | 5.041 | 1.785 | 25.7 |
| | R25 = −31.880 | | | |
| | BFL = 38.550 | | | |

In the foregoing Table XII, the iris defining the aperture stop is located between elements L6 and L7. Positive radii are struck from the right and negative radii are struck from the left.

The spacings of the groupings at different equivalent focal lengths are given below in Table XIV.

TABLE XIV

| | EFL | | | |
|---|---|---|---|---|
| Spacing | 51.5 mm | 85.00 mm | 135.00 mm | 195.00 mm |
| D1 | 2.174 mm | 12.738 mm | 18.123 mm | 22.250 mm |
| D2 | 39.191 mm | 25.950 mm | 12.813 mm | 2.000 mm |
| D3 | 12.937 mm | 8.055 mm | 3.253 mm | .500 mm |
| f/No. | 2.95 | 3.5 | 3.7 | 4.1 |

In the foregoing Table XIII, the iris defining the aperture stop is located between elements L10 and L11 and moves with sub-grouping SGIIIb. Positive radii are struck from the right and negative radii are struck from the left.

The spacings of the groupings at different equivalent focal lengths are given below in Table XV.

TABLE XV

| | EFL | | | |
|---|---|---|---|---|
| Spacing | 51.5 mm | 85.00 mm | 135.00 mm | 195.00 mm |
| D1 | 1.774 mm | 12.804 mm | 23.690 mm | 28.070 mm |
| D2 | 47.246 mm | 30.473 mm | 15.272 mm | 2.000 mm |
| D3 | 8.989 mm | 4.084 mm | 2.537 mm | .500 mm |
| f/No. | 2.95 | 3.5 | 3.7 | 4.1 |

Figure 6A:
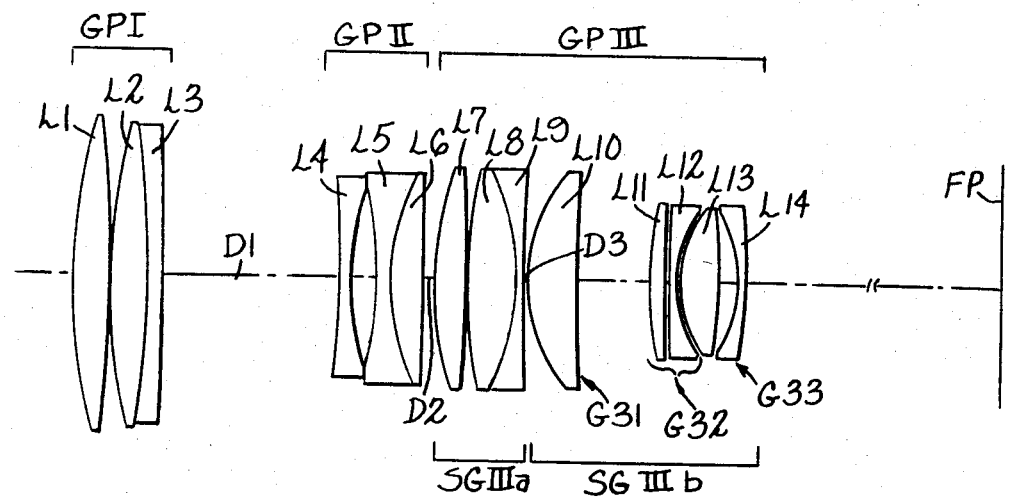
Figure 6B:
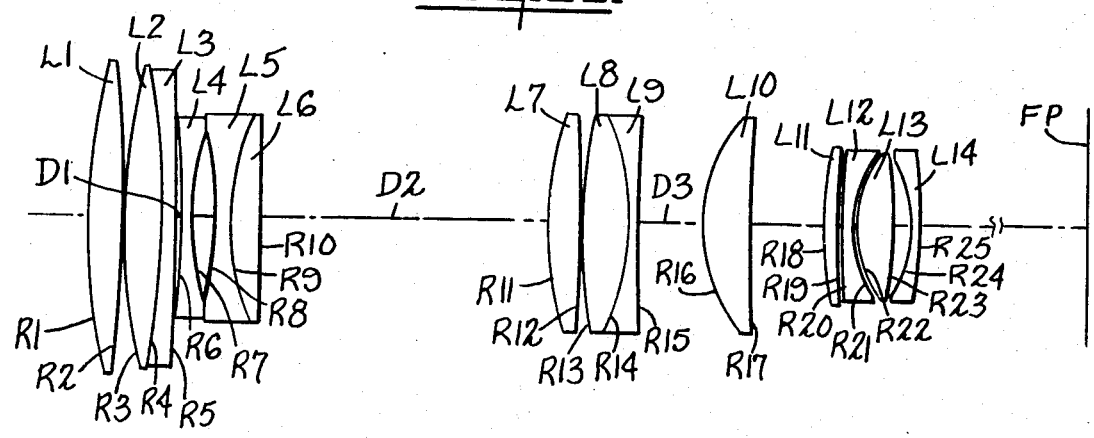

FIGS. 6a and 6b exemplify another embodiment of the invention which differs from the others primarily in that group G33 is a negative meniscus L14, concave to the object. Group G32 comprises a positive meniscus L11, a negative meniscus L12 fairly strongly concave to the image and a bi-convex positive element L13.

The lens subtends semi-field angles of 22.8° to 6.3°. A prescription of the lens as scaled to an image frame of 24×36 mm with an EFL range of 51.5 mm to 195.00 mm is given in Table XVI.

TABLE XVI

| Element | Radius of Curvature (mm) | Axial Distance Between Surfaces (mm) | Index of Refraction $N_d$ | Abbe No. $V_d$ |
|---|---|---|---|---|
| L1 | R1 = 94.324 | | | |
| | | 6.157 | 1.517 | 69.7 |
| | R2 = −225.278 | | | |
| | | 0.200 | | |
| | R3 = 107.461 | | | |
| L2 | | 6.256 | 1.487 | 70.4 |
| | R5 = −125.129 | | | |
| L3 | | 2.000 | 1.847 | 23.8 |
| | R5 = −998.950 | | | |
| | | 1.000 (D1) | | |
| | R6 = −175.603 | | | |
| L4 | | 1.500 | 1.713 | 53.9 |
| | R7 = 42.006 | | | |
| | | 4.571 | | |
| | R8 = −55.596 | | | |
| L5 | | 2.000 | 1.697 | 55.5 |
| | R9 = 38.480 | | | |
| L6 | | 4.988 | 1.847 | 23.8 |
| | R10 = −2603.400 | | | |
| | | 46.933 (D2) | | |
| | R11 = 57.230 | | | |
| L7 | | 5.338 | 1.607 | 56.7 |
| | R12 = −355.668 | | | |
| | | 0.200 | | |
| | R13 = 97.881 | | | |
| L8 | | 7.895 | 1.581 | 40.9 |
| | R15 = −38.031 | | | |
| L9 | | 1.500 | 1.847 | 23.8 |
| | R15 = 383.703 | | | |
| | | 10.275 (D3) | | |
| | R16 = 26.072 | | | |
| L10 | | 8.076 | 1.517 | 69.7 |
| | R17 = 264.855 | | | |
| | | 11.774 | | |
| | R18 = 57.188 | | | |
| L11 | | 2.581 | 1.487 | 70.4 |
| | R19 = 157.667 | | | |
| | | 0.588 | | |
| | R20 = 132.141 | | | |
| L12 | | 1.500 | 1.786 | 43.9 |
| | R21 = 17.553 | | | |
| | | 0.559 | | |
| | R22 = 18.852 | | | |
| L13 | | 6.418 | 1.648 | 33.8 |
| | R23 = −54.308 | | | |
| | | 2.694 | | |
| | R24 = −20.096 | | | |
| L14 | | 1.500 | 1.800 | 42.3 |
| | R25 = −96.886 | | | |
| | BFL = 38.540 | | | |

The lens of the foregoing Table XVI has an iris defining an aperture stop between elements L6 and L7 which moves with sub-grouping SGIIIa. Positive radii are struck from the right and negative radii are struck from the left.

The spacings of the movable elements at different EFL's are given below.

TABLE XVII

| | EFL | | | |
|---|---|---|---|---|
| Spacing | 51.5 mm | 85.00 mm | 135.00 mm | 195.00 mm |
| D1 | 1.000 mm | 13.397 mm | 23.707 mm | 29.111 mm |
| D2 | 46.933 mm | 30.323 mm | 14.940 mm | 2.000 mm |
| D3 | 10.275 mm | 5.303 mm | 2.400 mm | .500 mm |
| f/No. | 2.8 | 3.35 | 3.73 | 4.12 |

Figure 7A:
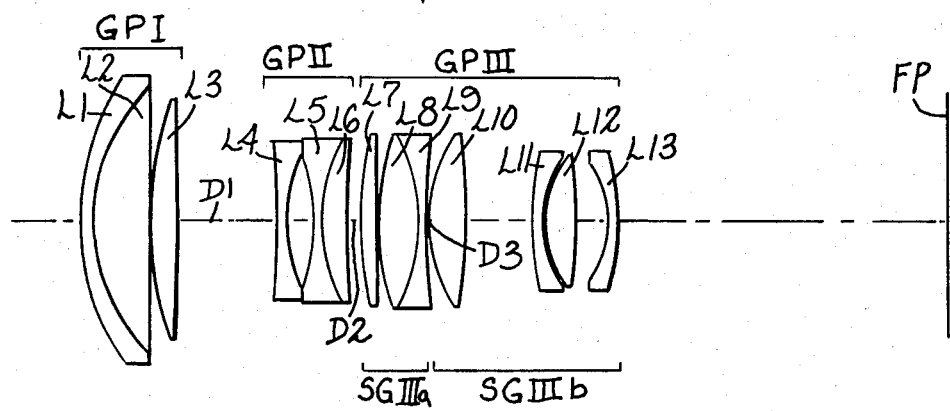
Figure 7B:
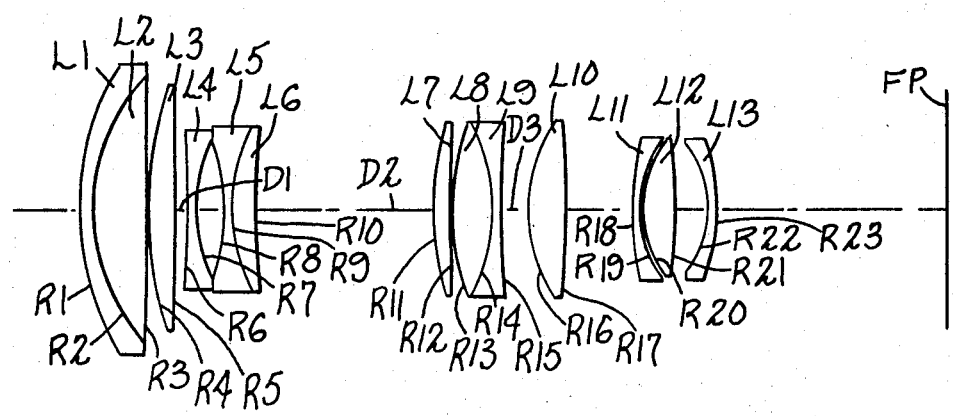

FIGS. 7a and 7b show an embodiment of the invention where grouping GPI includes a doublet comprising negative meniscus L1 and bi-convex element L2, followed by bi-convex element L3. Grouping GPII comprises bi-concave element L4 and a bi-concave doublet L5, L6. Grouping GPIII includes a first sub-grouping SGIIIa comprising a positive element L7, and convex-concave doublet L8, L9; and sub-grouping SGIIIb which comprises a bi-convex element L10, a negative meniscus L11 convex to the object side with a bi-convex element L12, and finally a negative meniscus L13 convex to the image side.

This lens as further set forth in Table XVIII has a lower EFL of 51.5 mm and an upper EFL of 150 mm. The exampled lens subtends semi-field angles of 22.8° to 8.2° as scaled to an image frame of 24×36 mm.

TABLE XVIII

| Element | Radius of Curvature (mm) | Axial Distance Between Surfaces (mm) | Index of Refraction $N_d$ | Abbe No. $V_d$ |
|---|---|---|---|---|
| L1 | R1 = 43.818 | | | |
| | | 2.00 | 1.805 | 25.5 |
| | R2 = 30.325 | | | |
| L2 | | 9.03 | 1.487 | 70.4 |
| | R3 = 660.800 | | | |
| | | 0.20 | | |
| | R4 = 57.757 | | | |
| L3 | | 4.58 | 1.487 | 70.4 |
| | R5 = −2198.63 | | | |
| | | 2.00 (D1) | | |
| | R6 = −172.476 | | | |
| L4 | | 1.50 | 1.786 | 43.9 |
| | R7 = 23.666 | | | |
| | | 4.44 | | |
| | R8 = −37.599 | | | |
| L5 | | 1.50 | 1.487 | 70.4 |
| | R9 = 27.572 | | | |
| L6 | | 4.19 | 1.847 | 23.8 |
| | R10 = 215.640 | | | |
| | | 28.88 (D2) | | |
| | R11 = 58.063 | | | |
| L7 | | 2.76 | 1.785 | 25.7 |
| | R12 = 451.184 | | | |
| | | .20 | | |
| | R13 = 40.879 | | | |
| L8 | | 6.43 | 1.487 | 70.4 |
| | R14 = −30.890 | | | |
| L9 | | 1.50 | 1.805 | 25.3 |
| | R15 = 179.032 | | | |
| | | 4.64 (D3) | | |
| | R16 = 26.196 | | | |
| L10 | | 5.72 | 1.487 | 70.4 |
| | R17 = −122.438 | | | |
| | | 11.13 | | |
| | R18 = 54.654 | | | |
| L11 | | 1.50 | 1.834 | 37.3 |
| | R19 = 17.104 | | | |
| | | 0.37 | | |
| | R20 = 17.908 | | | |
| L12 | | 5.14 | 1.626 | 35.5 |
| | R21 = −77.945 | | | |
| | | 5.29 | | |
| | R22 = −17.046 | | | |
| L13 | | 1.50 | 1.743 | 49.2 |
| | R23 = 40.228 | | | |
| | | 38.50 (D4) | | |

In the foregoing Table XVIII the iris defining the aperture is located between elements L6 and L7 and moves with sub-grouping SGIIIa. Positive radii are struck from the right and negative radii are struck from the left.

The variable spacings of the grouping at different EFL are given below in Table XIX.

TABLE XIX

| | EFL | | | |
|---|---|---|---|---|
| Spacing | 51.5 mm | 75 mm | 100 mm | 145 mm |
| D1 | 2.0 mm | 10.19 mm | 12.71 mm | 16.24 mm |
| D2 | 27.88 mm | 19.27 mm | 11.31 mm | 1.00 mm |
| D3 | 4.64 mm | 2.98 mm | 1.75 mm | 0.50 mm |
| D4 | 38.50 mm | 40.58 mm | 47.24 mm | 55.28 mm |
| f/No. | 3.2 | 3.3 | 3.7 | 4.1 |

Figure 8A:
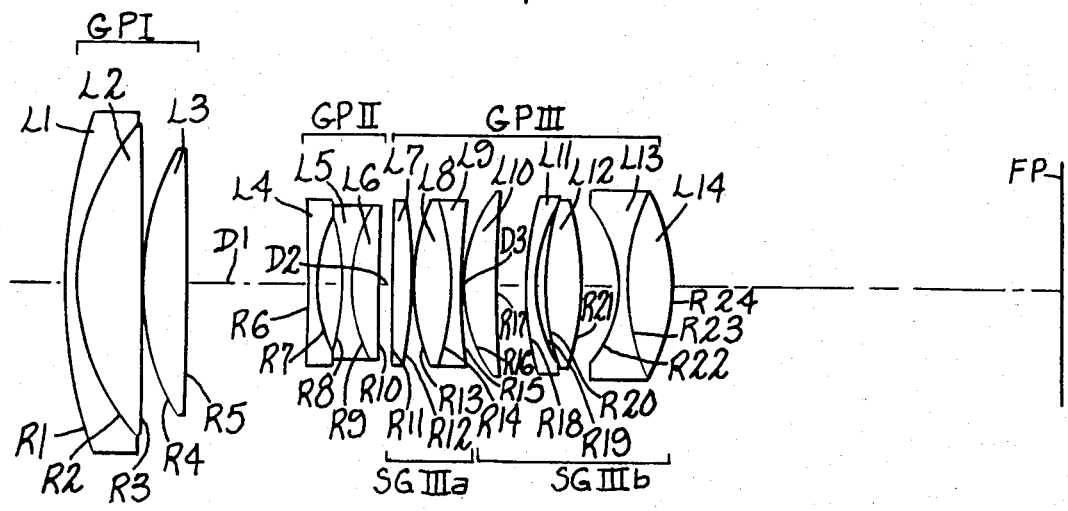
Figure 8B:
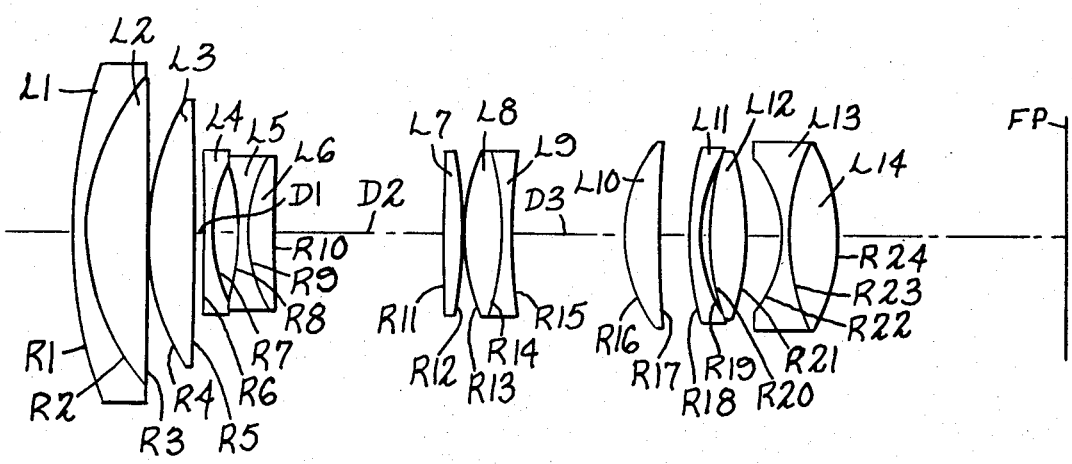

Another lens having fourteen elements and embodying the invention shown in FIGS. 8a–8b has the same general configuration as shown in FIGS. 5a and 5b with the exception that element L3 is bi-convex. This lens is set forth in Table XX. This lens has a lower EFL less than the diagonal of the image plane. This lens subtends semi-field angles of 29.6° to 8.4°. This lens as scaled to EFL's of 38.0 mm to 146.0 mm for an image frame of 24×36 mm is defined as follows:

TABLE XX

| Element | Radius of Curvature (mm) | Axial Distance Between Surfaces (mm) | Index of Refraction $N_d$ | Abbe No. $V_d$ |
|---|---|---|---|---|
| L1 | R1 = 84.075 | | | |
| | | 2.000 | 1.824 | 32.4 |
| | R2 = 35.070 | | | |
| L2 | | 10.644 | 1.487 | 70.4 |
| | R3 = Infinity | | | |
| | | 0.200 | | |
| | R4 = 42.216 | | | |
| L3 | | 7.293 | 1.640 | 60.2 |
| | R5 = −551.202 | | | |
| | | 1.417 (D1) | | |
| | R6 = 3577.318 | | | |
| L4 | | 1.500 | 1.773 | 49.6 |
| | R7 = 22.455 | | | |
| | | 4.403 | | |
| | R8 = −36.651 | | | |
| L5 | | 1.500 | 1.697 | 55.5 |
| | R9 = 23.130 | | | |
| L6 | | 4.494 | 1.847 | 23.8 |
| | R10 = 305.162 | | | |
| | | 27.789 (D2) | | |
| | R11 = 182.035 | | | |
| L7 | | 3.349 | 1.805 | 25.5 |
| | R12 = −83.526 | | | |
| | | .200 | | |
| | R13 = 31.013 | | | |
| L8 | | 6.560 | 1.487 | 70.4 |
| | R14 = −39.407 | | | |
| L9 | | 1.500 | 1.789 | 27.5 |
| | R15 = 83.438 | | | |
| | | 19.239 (D3) | | |
| | R16 = 24.898 | | | |
| L10 | | 5.344 | 1.592 | 60.5 |
| | R17 = 131.219 | | | |
| | | 4.888 | | |
| | R18 = 51.764 | | | |
| L11 | | 1.500 | 1.805 | 25.5 |
| | R19 = 22.511 | | | |
| | | 1.477 | | |
| | R20 = 32.129 | | | |
| L12 | | 6.196 | 1.599 | 62.1 |
| | R21 = −44.403 | | | |
| | | 6.00 | | |
| | R22 = −18.935 | | | |
| L13 | | 1.200 | 1.764 | 47.9 |
| | R23 = 31.004 | | | |
| L14 | | 7.807 | 1.692 | 36.9 |
| | R24 = −31.715 | | | |
| | BFL = 38.572 | | | |

In the foregoing Table XX, the iris defining the aperture stop is located between elements L6 and L7 and moves with sub-grouping SGIIIa. Positive radii are struck from the right and negative radii are struck from the left.

The variable spacings of the grouping at different EFL's are given below in Table XXI.

TABLE XXI

| | EFL | | | |
|---|---|---|---|---|
| Spacing | 38.0 mm | 70.0 mm | 110.0 mm | 146.0 mm |
| D1 | 1.417 mm | 12.00 mm | 17.61 mm | 20.09 mm |
| D2 | 28.58 mm | 16.89 mm | 8.25 mm | 2.80 mm |
| D3 | 19.24 mm | 10.30 mm | 4.49 mm | .50 mm |

TABLE XXI-continued

| | EFL | | | |
|---|---|---|---|---|
| f/No. | 2.95 | 3.32 | 3.7 | 4.1 |

Figure 9A:
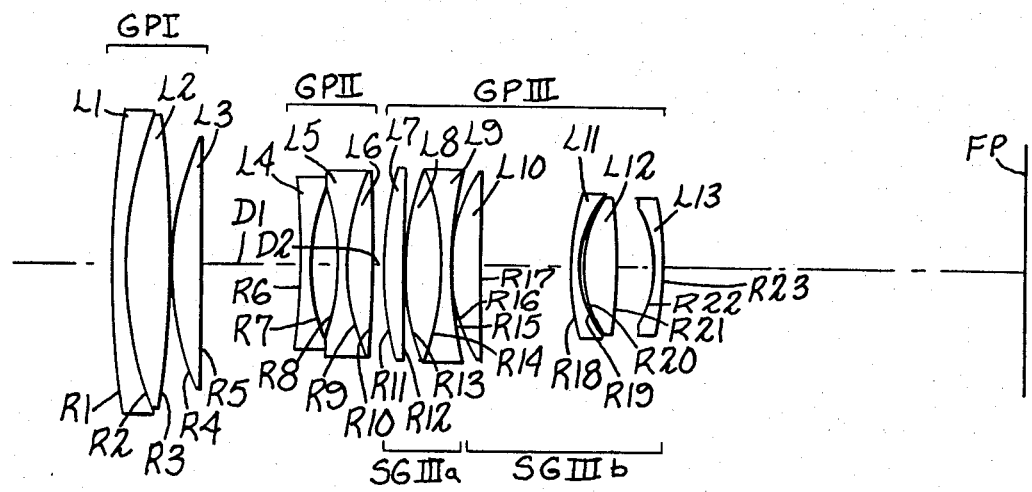
Figure 9B:
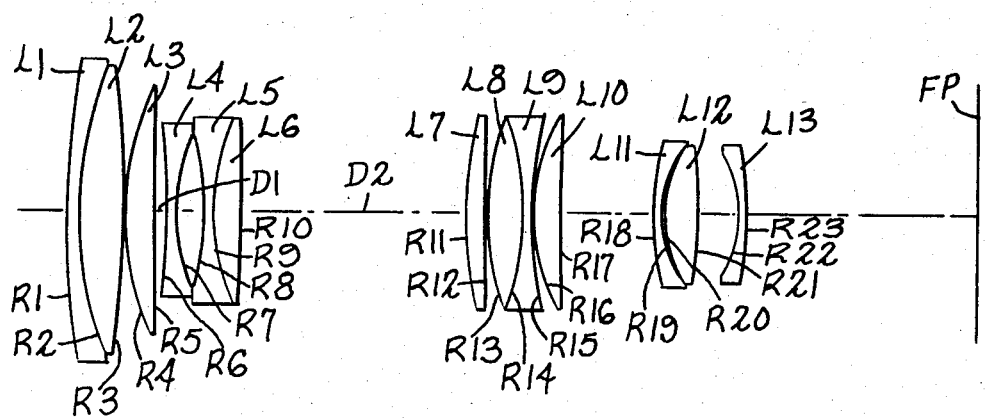

Another lens embodying the invention shown in FIGS. 9a and 9b has the same overall configuration as shown in FIGS. 7a and 7b. However, the lens as set forth in Table XXII has no relative movement between the sub-groupings of Grouping GPIII during zooming. This lens has elements L1–L13 as more specifically set forth in Table XXII.

The lens of Table XXII has an EFL range of 51.5 mm to 145.0 mm as scaled to an image frame of 24×36 mm with semi-field angles of 22.8° to 8.5°.

TABLE XXII

| Element | Radius of Curvature (mm) | Axial Distance Between Surfaces (mm) | Index of Refraction $N_d$ | Abbe No. $V_d$ |
|---|---|---|---|---|
| L1 | R1 = 154.274 | 2.000 | 1.805 | 25.5 |
| | R2 = 60.625 | | | |
| L2 | | 7.482 | 1.603 | 60.7 |
| | R3 = 166.752 | | | |
| | | 0.200 | | |
| | R4 = 49.425 | | | |
| L3 | | 4.711 | 1.487 | 70.4 |
| | R5 = 976.009 | | | |
| | | 2.000 (D1) | | |
| | R6 = −111.965 | | | |
| L4 | | 1.500 | 1.834 | 37.3 |
| | R7 = 29.937 | | | |
| | | 4.683 | | |
| | R8 = −40.282 | | | |
| L5 | | 1.500 | 1.487 | 70.4 |
| | R9 = 34.267 | | | |
| L6 | | 4.190 | 1.847 | 23.8 |
| | R10 = −661.409 | | | |
| | | 37.179 (D2) | | |
| | R11 = 58.780 | | | |
| L7 | | 3.370 | 1.785 | 25.7 |
| | R12 = 588.325 | | | |
| | | 0.200 | | |
| | R13 = 40.593 | | | |
| L8 | | 6.062 | 1.518 | 59.0 |
| | R14 = −38.790 | | | |
| L9 | | 1.500 | 1.805 | 25.5 |
| | R15 = 60.207 | | | |
| | | 0.200 | | |
| | R16 = 29.884 | | | |
| L10 | | 4.661 | 1.603 | 60.7 |
| | R17 = Infinity | | | |
| | | 15.024 | | |
| | R18 = 47.488 | | | |
| L11 | | 1.500 | 1.834 | 37.3 |
| | R19 = 17.934 | | | |
| | | 0.309 | | |
| | R20 = 18.509 | | | |
| L12 | | 5.462 | 1.632 | 34.8 |
| | R21 = −62.404 | | | |
| | | 6.267 | | |
| | R22 = −19.946 | | | |
| L13 | | 1.500 | 1.834 | 37.3 |
| | R23 = −58.480 | | | |
| | BFL = 38.590 | | | |

In the foregoing Table XXII, the iris defining the aperture stop is located between elements L6 and L7, and moves with grouping GPIII. Positive radii are struck from the right and negative radii are struck from the left.

The variable spacings of the grouping at different EFL's are given in Table XXIII.

TABLE XXIII

| | EFL | | | |
|---|---|---|---|---|
| Spacing | 51.5 mm | 65.00 mm | 80.00 mm | 145.00 mm |
| D1 | 2.00 mm | 5.63 mm | 9.14 mm | 16.17 mm |
| D2 | 37.8 mm | 29.28 mm | 21.50 mm | 2.00 mm |
| f/No. | 3.2 | 3.48 | 3.61 | 4.12 |

Figure 10A:
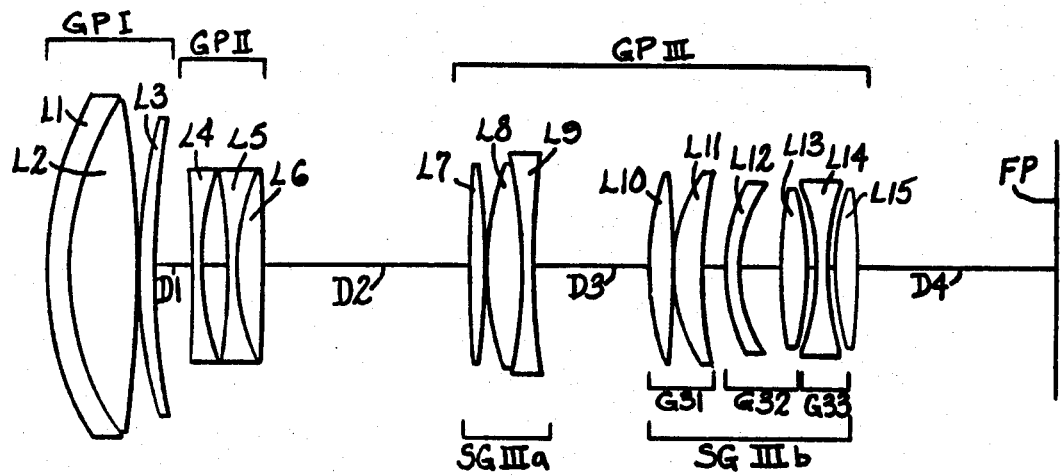
Figure 10B:
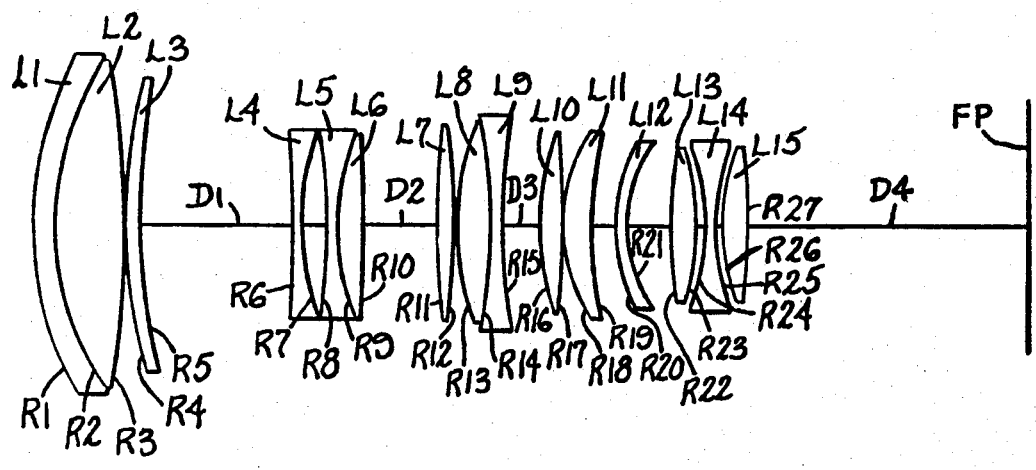

Another embodiment of the invention as shown in FIGS. 10a and 10b utilizes fifteen elements L1–L15. This embodiment differs primarily in that group G31 of sub-groupings SGIIIa comprises an additional element in the form of a positive meniscus L11, convex to the object. Groupings GPI and GP2 and sub-grouping SGIIIa again each comprise three elements.

The prescriptions of two lenses of this form are set forth in Tables XXIV and XXV. In the example of Table XXIV, the lens sub-tends a semi-field angle varying from 22.7° to 6.4°, and is scaled for a 24×36 mm image frame with an EFL range of 51.53 mm to 194.98 mm. In the example of Table XXV, the lens sub-tends a semi-field angle varying from 22.8° to 6.4°, and is scaled for a 24×36 mm image frame with an EFL range of 51.44 mm to 194.05 mm.

TABLE XXIV

| Element | Radius of Curvature (mm) | Axial Distance Between Surfaces (mm) | Index of Refraction $N_d$ | Abbe No. $V_d$ |
|---|---|---|---|---|
| L1 | R1 = 61.614 | 3.000 | 1.805 | 25.5 |
| | R2 = 43.179 | | | |
| L2 | | 11.800 | 1.487 | 70.4 |
| | R3 = −262.146 | | | |
| | | 0.200 | | |
| | R4 = 57.758 | | | |
| L3 | | 3.500 | 1.487 | 70.4 |
| | R5 = 84.442 | | | |
| | | 32.117 (D1) | | |
| | R6 = −1317.271 | | | |
| L4 | | 1.500 | 1.804 | 46.5 |
| | R7 = 36.278 | | | |
| | | 5.516 | | |
| | R8 = −44.483 | | | |
| L5 | | 1.500 | 1.773 | 49.6 |
| | R9 = 34.734 | | | |
| L6 | | 5.000 | 1.847 | 23.8 |
| | R10 = −219.127 | | | |
| | | 3.250 (D2) | | |
| | R11 = 234.035 | | | |
| L7 | | 3.350 | 1.699 | 30.1 |
| | R12 = −89.453 | | | |
| | | 0.200 | | |
| | R13 = 43.887 | | | |
| L8 | | 6.600 | 1.487 | 70.4 |
| | R14 = −58.165 | | | |
| L9 | | 1.500 | 1.785 | 26.1 |
| | R15 = 117.280 | | | |
| | | 1.000 (D3) | | |
| | R16 = 43.796 | | | |
| L10 | | 4.200 | 1.487 | 70.4 |
| | R17 = 1423.188 | | | |
| | | 0.200 | | |
| | R18 = 25.838 | | | |
| L11 | | 5.600 | 1.487 | 70.4 |
| | R19 = 64.901 | | | |
| | | 4.495 | | |
| | R20 = 27.729 | | | |
| L12 | | 2.000 | 1.805 | 25.5 |
| | R21 = 18.696 | | | |
| | | 8.570 | | |
| | R22 = 72.878 | | | |
| l13 | | 4.900 | 1.487 | 70.4 |
| | R23 = −31.396 | | | |
| | | 2.125 | | |
| | R24 = −23.175 | | | |
| L14 | | 1.200 | 1.804 | 46.5 |
| | R25 = 43.273 | | | |

TABLE XXIV-continued

| Element | Radius of Curvature (mm) | Axial Distance Between Surfaces (mm) | Index of Refraction $N_d$ | Abbe No. $V_d$ |
|---|---|---|---|---|
| | | 0.571 | | |
| | R26 = 46.400 | | | |
| L15 | | 3.900 | 1.805 | 25.5 |
| | R27 = −124.368 | | | |

TABLE XXV

| Element | Radius of Curvature (mm) | Axial Distance Between Surfaces (mm) | Index of Refraction $N_d$ | Abbe No. $V_d$ |
|---|---|---|---|---|
| L1 | R1 = 76.881 | 3.000 | 1.805 | 25.5 |
| | R2 = 48.966 | | | |
| L2 | | 12.250 | 1.487 | 70.4 |
| | R3 = −164.561 | | | |
| | | 0.210 | | |
| | R4 = 45.744 | | | |
| L3 | | 3.500 | 1.517 | 64.2 |
| | R5 = 64.414 | | | |
| | | 30.449 (D1) | | |
| | R6 = 230.226 | | | |
| L4 | | 1.500 | 1.713 | 53.9 |
| | R7 = 32.025 | | | |
| | | 5.200 | | |
| | R8 = −39.590 | | | |
| L5 | | 1.500 | 1.773 | 49.6 |
| | R9 = 36.704 | | | |
| L6 | | 5.000 | 1.847 | 23.8 |
| | R10 = −235.177 | | | |
| | | 3.750 (D2) | | |
| | R11 = −166.537 | | | |
| L7 | | 2.800 | 1.785 | 26.1 |
| | R12 = −72.127 | | | |
| | | 0.200 | | |
| | R13 = 46.928 | | | |
| L8 | | 7.300 | 1.487 | 70.4 |
| | R14 = −50.494 | | | |
| L9 | | 1.500 | 1.785 | 26.1 |
| | R15 = 526.365 | | | |
| | | 1.010 (D3) | | |
| | R16 = 64.334 | | | |
| L10 | | 4.200 | 1.487 | 70.4 |
| | R17 = −211.416 | | | |
| | | 0.200 | | |
| | R18 = 29.665 | | | |
| L11 | | 5.450 | 1.487 | 70.4 |
| | R19 = 76.428 | | | |
| | | 9.370 | | |
| | R20 = 26.516 | | | |
| L12 | | 2.000 | 1.847 | 23.8 |
| | R21 = 19.733 | | | |
| | | 6.680 | | |
| | R22 = 64.036 | | | |
| L13 | | 5.200 | 1.487 | 70.4 |
| | R23 = −30.409 | | | |
| | | 1.280 | | |
| | R24 = −25.289 | | | |

TABLE XXV-continued

| Element | Radius of Curvature (mm) | Axial Distance Between Surfaces (mm) | Index of Refraction $N_d$ | Abbe No. $V_d$ |
|---|---|---|---|---|
| L14 | | 1.200 | 1.804 | 46.5 |
| | R25 = 52.130 | | | |
| | | 3.230 | | |
| | R26 = 62.262 | | | |
| L15 | | 4.280 | 1.805 | 25.5 |
| | R27 = −189.602 | | | |

In the foregoing Table XXIV the iris defining the aperture stop is located between elements L6 and L7, and moves with sub-groupings SGIIIa. Positive radii are struck from the right and negative radii are struck from the left.

The spacings of the groupings at different equivalent focal lengths are given below in Table XXVI.

TABLE XXVI

| | EFL | | | |
|---|---|---|---|---|
| Spacing | 51.35 mm | 85.07 mm | 135.12 mm | 194.98 mm |
| D1 | 32.12 mm | 27.15 mm | 15.69 mm | 2.71 mm |
| D2 | 3.25 mm | 13.17 mm | 24.65 mm | 37.62 mm |
| D3 | 1.00 | 6.00 mm | 12.30 mm | 22.24 mm |
| f/No. | 2.91 | 3.40 | 3.75 | 4.15 |

In Table XXV, the iris defining the aperture stop is located between elements L6 and L7 and moves with sub-grouping SGIIIa. Positive radii are struck from the right and negative radii are struck from the left.

The spacings of the groupings at different equivalent focal lengths are given below in Table XXVII.

TABLE XXVII

| | EFL | | | |
|---|---|---|---|---|
| Spacing | 51.44 mm | 84.39 mm | 133.96 mm | 194.05 mm |
| D1 | 30.45 mm | 25.55 mm | 15.16 mm | 2.64 mm |
| D2 | 3.75 mm | 13.95 mm | 26.33 mm | 40.44 mm |
| D3 | 1.01 mm | 7.12 mm | 13.68 mm | 22.38 mm |
| f/No. | 2.91 | 3.40 | 3.75 | 4.15 |

TABLE XXVIII

| Table | $F_I$ | $f_{II}$ | $f_{IIIa}$ | $f_{IIIb}$ | fG31 | fG32 | fG33 | Ratio | $\phi G1/\phi G3$ | Telephoto Ratio | Telephoto Ratio SGIIIb |
|---|---|---|---|---|---|---|---|---|---|---|---|
| I | 1.98 | −0.71 | 1.98 | 1.83 | 0.98 | 1.28 | −0.53 | 3.79 | 0.54 | 0.9 | 0.81 |
| IV | 1.80 | −0.62 | 1.96 | 1.66 | 0.97 | 1.02 | −0.52 | 3.79 | 0.54 | 0.9 | 0.85 |
| VIII | 1.86 | −0.62 | 2.17 | 1.53 | 1.15 | 1.51 | −0.75 | 3.79 | 0.65 | 0.87 | 0.92 |
| X | 2.07 | −0.66 | 2.30 | 2.10 | 1.61 | 1.70 | −1.02 | 4.76 | 0.63 | 0.97 | 0.94 |
| XII | 1.47 | −0.49 | 1.63 | 1.65 | 1.22 | 2.13 | −1.04 | 3.79 | 0.85 | 0.9 | 0.93 |
| V | 1.90 | −0.65 | 2.13 | 1.53 | 1.06 | 2.13 | −0.86 | 3.79 | 0.81 | 0.9 | 0.9 |
| XIII | 1.72 | −0.61 | 1.85 | 1.69 | 1.12 | 3.22 | −1.12 | 3.79 | 1.00 | 0.9 | 0.89 |
| XVI | 1.89 | −0.65 | 1.95 | 1.73 | 1.07 | 1.42 | −0.62 | 3.79 | 0.58 | 0.9 | 0.85 |
| XXII | 1.62 | −0.51 | 1.76 | 1.60 | 1.33 | 2.03 | −1.64 | 3.84 | 1.27 | 1.13 | 1.01 |
| XVIII | 1.26 | −0.46 | 1.11 | 1.11 | 0.86 | 1.92 | −0.79 | 2.82 | 0.92 | 0.99 | 0.96 |
| XX | 1.32 | −0.55 | 3.02 | 0.99 | 0.96 | 1.24 | −0.71 | 2.82 | 0.74 | 1.03 | 1.1 |
| XXIV | 1.89 | −0.56 | 1.72 | 1.59 | 0.86 | 1.68 | −0.69 | 3.78 | 0.80 | 0.94 | 0.90 |
| XXV | 1.88 | −0.58 | 1.97 | 1.58 | 0.96 | 1.30 | −0.69 | 3.77 | 0.73 | 0.99 | 0.93 |

TABLE XXIX

| TABLE | $f_I/FVD$ | $|f_{II}/FVD|$ | $f_{IIIa}/FVD$ | $f_{IIIb}/FVD$ |
|---|---|---|---|---|
| I | 0.58 | 0.21 | 0.58 | 0.54 |
| IV | 0.53 | 0.18 | 0.57 | 0.49 |
| VIII | 0.56 | 0.19 | 0.66 | 0.46 |
| X | 0.45 | 0.14 | 0.50 | 0.45 |
| XII | 0.43 | 0.14 | 0.48 | 0.48 |
| V | 0.56 | 0.19 | 0.62 | 0.45 |
| XIII | 0.50 | 0.18 | 0.54 | 0.50 |
| XVI | 0.55 | 0.19 | 0.57 | 0.51 |
| XXII | 0.37 | 0.12 | 0.41 | 0.37 |

TABLE XXIX-continued

| TABLE | $f_I$/FVD | $|f_{II}/FVD|$ | $f_{IIIa}$/FVD | $f_{IIIb}$/FVD |
|---|---|---|---|---|
| XVIII | 0.45 | 0.16 | 0.40 | 0.40 |
| XX | 0.45 | 0.19 | 1.04 | 0.34 |
| XXIV | 0.53 | 0.16 | 0.48 | 0.45 |
| XXV | 0.50 | 0.15 | 0.53 | 0.42 |

Tables XXVIII and XXIV show the focal lengths of the various groupings, sub-groupings and groups as follows, as well as other parameters where FVD is the front vertex distance related to unity EFL at the lower limit EFL of the lens, $f_I$ is the EFL of grouping GPI related to unity EFL at the lower limit EFL of the lens, $f_{II}$ is the EFL of grouping GPII related to unity EFL at the lower limit EFL of the lens, $f_{IIIa}$ is the EFL of sub-grouping SGIIIa related to unity EFL at the lower limit EFL of the lens, $f_{IIIb}$ is the EFL of sub-grouping SGIIIb related to unity EFL at the lower limit EFL of the lens, $f_{G31}$ is the EFL of group G31 related to unity EFL at the lower limit EFL of the lens, $f_{G32}$ is the EFL of group G32 related to unity EFL at the lower limit EFL of the lens, $f_{G33}$ is the EFL of group G33 related to unity EFL at the lower lmit EFL of the lens, Telephoto Ratio is the ratio of the front vertex distance of the lens to the upper EFL of the lens, Zoom Ratio is the ratio of the higher EFL of the lens to the lower EFL, $$\left|\frac{\phi G1}{\phi G3}\right|$$

is the absolute ratio of the power of group G31 to the power of group G33,

Telephoto Ratio $SG_{IIIb}$ is the ratio of the front vertex distance of sub-grouping $SG_{IIIb}$ to its equivalent focal length.

It will be noted that in all cases $$\left|\frac{\phi G1}{\phi G3}\right|$$

is substantially equal to or greater than 0.5. Otherwise stated, $$\frac{\phi G1}{\phi G3} \geq .5$$

In all examples given, it has been found that the object side surface of G33 should be concave to introduce the proper aberration corrections. If the foregoing ratio decreases below the expressed value, the aberration contribution of the object side surface of group G33 may become unacceptably large.

Usually $$\left|\frac{\phi G1}{\phi G3}\right|$$

will be less than 1.45.

All lens examples will focus to a magnification of 1:4 at the longest focal length by virtue of the structure of the overall lens and the front focusing grouping GP1.

The smaller the value of $f_1$ the shorter the travel of grouping GPI to focus at close objects. As shown by the examples, the following relation is preferred to achieve this result.

$$2.5f_I > f_{IIIa} \geq 0.9 \, f_I$$

where $f_{IIIa}$ and $f_I$ are as previously defined.

Also for proper aberration correction, the EFL $f_{IIIa}$ of sub-grouping SGIIIa should be substantially the same as or greater than the EFL $f_{IIIb}$ of sub-grouping SGIIIb or $$3.2f_{IIIb} > f_{IIIa} \geq f_{IIIb}$$

This relationship further permits the lens to close focus to magnifications of 1:4 with relatively small axial movement of grouping GPI. For example, the lens of Table XII may focus this close with only 7.05 mm of axial extension.

With reference to Table XXIX the following relations are obtained:

$$0.3 \leq f_I/FVD \leq 0.6$$

$$0.10 \leq |f_{II}/FVD| 23\, 0.25$$

$$0.3 \leq f_{IIIa}/FVD \leq 1.2$$

$$0.3 \leq f_{IIIb}/FVD \leq 0.6$$

where $f_I$, $f_{II}$, $f_{IIIa}$, $f_{IIIb}$, and FVD are as previously defined.

As shown by the various examples, various lens forms may be made within the scope of the invention. Accordingly, the appended claims are intended to cover all modifications of the disclosed embodiments as well as other embodiments thereof which do not depart from the spirit and scope of the invention.

What is claimed is:

1. A zoom lens comprising from the object side a first positive grouping movable axially for focusing, a second negative grouping, and a third positive grouping, said second and third groupings being movable simultaneously axially of said lens but in the opposite direction for varying the equivalent focal length of said lens, said third grouping comprising a front and rear sub-groupings of positive optical power, said rear sub-grouping comprises three groups which from the object end are of positive, positive and negative optical powers, successively.

2. The lens of claim 1 where said sub-groupings move at different rates as the equivalent focal length of said lens is varied.

3. The lens of claim 1 where $$0.75 < TR < 1.4$$

where TR is the telephoto ratio of the rear sub-grouping.

4. The lens of claim 1 where the optical power of said first group of said sub-grouping has an absolute ratio to the optical power of said third group of said sub-grouping of 0.5 or greater.

5. The lens of claim 4 where said ratio has an upper limit of 1.45.

6. The lens of claim 4 where the object side surface of said third group is concave.

7. The lens of claim 1 where said third grouping has a first sub-grouping on the object side with equivalent focal length $f_{IIIa}$ and $$\frac{f_{IIIa}}{f_I} \gtrsim .9$$

where $f_I$ is the equivalent focal length of the first grouping.

8. The lens of claim 6 where $$2.5 > \frac{f_{IIIa}}{f_I} \gtrsim .9$$

9. The lens of claim 1 where $$3.2\, f_{IIIb} > f_{IIIa} \geqq f_{IIIb}$$

where $f_{IIIa}$ is the equivalent focal length of the first sub-grouping and $f_{IIIb}$ is the equivalent focal length of the second sub-grouping.

10. The lens of claim 7 where said first grouping comprises an object side doublet which is a negative meniscus and a bi-convex element, followed by a positive meniscus.

11. The lens of claim 7 where the front grouping is a doublet comprising a bi-concave element and a bi-convex element, followed by a bi-convex element.

12. The lens of claim 11 where the doublet is of negative optical power.

13. The lens of claim 1 where said third grouping has a first object side sub-grouping of positive power and said sub-grouping comprises from the object side a positive element and a doublet comprising a bi-concave element and a bi-convex element.

14. The lens of claim 1 where the second grouping has a first object side group comprising a negative element, and a doublet concave to the object side and convex to the image side.

15. The lens of claim 1 where the second grouping is, from the object side, a doublet comprising a bi-convex element and a bi-concave element followed by a negative element having a concave object side surface.

16. The lens of claim 1 wherein the second grouping comprises from the object side a negative optical power element, a positive meniscus element concave to the object side, and a doublet concave to the object side and convex to the image side.

17. The lens of claim 1 wherein said first sub-grouping comprises a doublet having a bi-convex element and a negative element.

18. The lens of claim 1 wherein said first sub-grouping is a doublet in the form of a negative meniscus and a bi-convex element, from the object side.

19. The lens of claim 1 wherein said first sub-grouping comprises a positive single element and a weak optical power doublet which includes a bi-convex element.

20. A zoom lens comprising from the object side a first positive grouping movable axially for focusing, a second negative grouping, a third positive grouping, said second and third groupings being movable axially simultaneously but in the opposite direction for varying the equivalent focal length of said lens, said third grouping comprising front and rear sub-groupings of positive optical power, said rear sub-grouping having a telephoto ratio of 0.75 to 1.4 and the ratio of the equivalent focal length of the first sub-grouping to that of the second sub-grouping of from 1.0 to 3.2.

21. The lens of claim 20 where said sub-groupings move at different rates as the equivalent focal length of the lens is changed.

22. A zoom lens comprising from the object side a first positive grouping movable axially for focusing, a second negative group, and a third positive grouping, said second and third groupings being movable simultaneously axially of said lens, but in opposite directions for varying the equivalent focal length of said lens, said third grouping comprising front and rear sub-groupings of positive optical power, said rear sub-grouping comprising from the object end a first positive group, a second positive group, and a third negative group, the absolute value of the ratio of the optical power of the first positive group to the third negative group being 0.5 or greater, said third negative group having a concave object side surface.

23. A lens according to claim 1 having semi-field angles of 22.8° to 6.3° as scaled to a 24×36 mm image frame defined substantially as follows:

| Element | Radius of Curvature (mm) | Axial Distance Between Surfaces (mm) | Index of Refraction $N_d$ | Abbe No. $V_d$ |
|---|---|---|---|---|
| L1 | R1 = −331.909 | 2.000 | 1.847 | 23.8 |
|    | R2 = 77.893 | | | |
| L2 | | 8.325 | 1.531 | 50.9 |
|    | R3 = −105.577 | 0.200 | | |
|    | R4 = 75.550 | | | |
| L3 | | 5.264 | 1.741 | 35.1 |
|    | R5 = −738.126 | 1.000 | | |
|    | R6 = −273.757 | | | |
| L4 | | 4.990 | 1.847 | 23.8 |
|    | R7 = −39.174 | | | |
| L5 | | 2.000 | 1.697 | 55.5 |
|    | R8 = 74.538 | 4.086 | | |
|    | R9 = −53.121 | | | |
| L6 | | 1.500 | 1.697 | 55.5 |
|    | R10 = 148.879 | 49.510 | | |
|    | R11 = 46.961 | | | |
| L7 | | 4.902 | 1.608 | 40.0 |
|    | R12 = −929.669 | 0.200 | | |
|    | R13 = 726.860 | | | |
| L8 | | 6.485 | 1.587 | 51.7 |
|    | R14 = −31.445 | | | |
| L9 | | 1.500 | 1.847 | 23.8 |
|    | R15 = −260.591 | 10.825 | | |
|    | R16 = 23.960 | | | |
| L10 | | 8.148 | 1.517 | 69.7 |
|    | R17 = 249.885 | 11.397 | | |
|    | R18 = 64.858 | | | |
| L11 | | 1.500 | 1.804 | 46.5 |
|    | R19 = 16.770 | 0.467 | | |
|    | R20 = 18.004 | | | |
| L12 | | 6.440 | 1.648 | 33.8 |
|    | R21 = −46.653 | 2.692 | | |
|    | R22 = −18.862 | | | |
| L13 | | 1.500 | 1.834 | 37.3 |
|    | R23 = −106.740 | | | |

Where L1–L13 are lens elements from the object end to the image end successively. R1–R23 are the radii of the element surfaces successively from the object to image end. $N_d$ is the index of refraction of the elements, and $V_d$ is the dispersion of the elements as measured by the Abbe number.

24. A lens according to claim 1 having semi-field angles of 22.8° to 6.3° as scaled to a 24×36 mm image frame defined substantially as follows:

| Element | Radius of Curvature (mm) | Axial Distance Between Surfaces (mm) | Index of Refraction $N_d$ | Abbe No. $V_d$ |
|---|---|---|---|---|
| L1 | R1 = 91.606 | 6.157 | 1.517 | 69.7 |
|    | R2 = −204.977 | 0.200 | | |
| L2 | R3 = 99.209 | 6.256 | 1.487 | 70.4 |
|    | R4 = −121.897 | | | |
| L3 | R5 = −1311.231 | 2.000 | 1.847 | 23.8 |
|    |                | 1.000 | | |
| L4 | R6 = −207.668 | 1.500 | 1.713 | 53.9 |
|    | R7 = 39.369 | 4.571 | | |
| L5 | R8 = −48.686 | 2.000 | 1.697 | 55.5 |
|    | R9 = 39.043 | | | |
| L6 | R10 = −564.889 | 4.988 | 1.847 | 23.8 |
|    |                | 46.831 | | |
| L7 | R11 = 54.481 | 5.338 | 1.607 | 56.7 |
|    | R12 = −374.746 | 0.200 | | |
| L8 | R13 = 77.405 | 7.895 | 1.581 | 40.9 |
|    | R14 = −36.501 | | | |
| L9 | R15 = 194.707 | 1.500 | 1.847 | 23.8 |
|    |                | 9.109 | | |
| L10 | R16 = 26.911 | 8.076 | 1.525 | 60.0 |
|     | R17 = −1041.865 | 9.346 | | |
| L11 | R18 = 52.178 | 1.838 | 1.559 | 64.4 |
|     | R19 = 21.897 | 3.425 | | |
| L12 | R20 = 28.087 | 5.298 | 1.627 | 34.6 |
|     | R21 = −62.138 | 2.562 | | |
| L13 | R22 = −23.600 | 1.500 | 1.834 | 37.3 |
|     | R23 = 28.021 | 0.445 | | |
| L14 | R24 = 28.914 | 4.385 | 1.619 | 35.4 |
|     | R25 = −118.264 | | | |

Where L1–L14 are lens elements from the object end to the image end successively. R1–R25 are the radii of the element surfaces successively from the object to image end. $N_d$ is the index of refraction of the elements, and $V_d$ is the dispersion of the elements as measured by the Abbe number.

25. A lens according to claim 1 having semi-field angles of 22.8° to 6.3° as scaled to a 24×36 mm image frame defined substantially as follows:

| Element | Radius of Curvature (mm) | Axial Distance Between Surfaces (mm) | Index of Refraction $N_d$ | Abbe No. $V_d$ |
|---|---|---|---|---|
| L1 | R1 = 311.481 | 2.000 | 1.847 | 23.8 |
|    | R2 = 68.476 | | | |
| L2 | R3 = −108.672 | 9.718 | 1.589 | 62.6 |
|    |               | 0.200 | | |
| L3 | R4 = 50.060 | 4.222 | 1.690 | 31.0 |
|    | R5 = 84.784 | 2.822 | | |
|    | R6 = 508.164 | | | |
| L4 |              | 5.563 | 1.847 | 23.8 |
|    | R7 = −47.257 | 2.000 | 1.696 | 55.1 |
| L5 | R8 = 41.931 | 5.239 | | |
|    | R9 = −38.143 | | | |
| L6 |              | 1.500 | 1.711 | 53.9 |
|    | R10 = Infinity | 47.717 | | |
| L7 | R11 = 59.518 | 7.648 | 1.571 | 51.1 |
|    | R12 = −30.945 | | | |
| L8 | R13 = −106.827 | 1.500 | 1.831 | 24.2 |
|    |                | 4.906 | | |
| L9 | R14 = 22.295 | 7.351 | 1.487 | 70.4 |
|    | R15 = 85.618 | 18.021 | | |
| L10 | R16 = 54.725 | 5.731 | 1.631 | 34.2 |
|     | R17 = −16.627 | | | |
| L11 | R18 = −68.855 | 1.500 | 1.806 | 40.7 |
|     |               | 2.363 | | |
| L12 | R19 = −19.620 | 1.500 | 1.806 | 40.7 |
|     | R20 = −53.856 | | | |

Where L1–L12 are lens elements from the object end to the image end successively. R1–R20 are the radii of the element surfaces successively from the object to image end. $N_d$ is the index of refraction of the elements, and $V_d$ is the dispersion of the elements as measured by the Abbe number.

26. A lens according to claim 1 having semi-field angles of 27.8° to 6.3° as scaled to a 24×36 mm image frame defined substantially as follows:

| Element | Radius of Curvature (mm) | Axial Distance Between Surfaces (mm) | Index of Refraction $N_d$ | Abbe No. $V_d$ |
|---|---|---|---|---|
| L1 | R1 = 87.088 | 6.073 | 1.487 | 70.4 |
|    | R2 = −357.220 | 0.200 | | |
| L2 | R3 = 81.894 | 6.904 | 1.517 | 69.7 |
|    | R4 = −113.558 | | | |
| L3 | R5 = −741.212 | 2.000 | 1.805 | 25.5 |
|    |               | 1.000 | | |
| L4 | R6 = −145.203 | 2.000 | 1.850 | 32.2 |
|    | R7 = 29.227 | 5.027 | | |
| L5 | R8 = −40.720 | 3.218 | 1.617 | 36.6 |
|    | R9 = −28.743 | 0.329 | | |
| L6 | R10 = −34.696 | 2.000 | 1.620 | 60.3 |
|    | R11 = 30.644 | | | |
| L7 | R12 = −836.811 | 4.602 | 1.847 | 23.8 |
|    |                | 47.970 | | |
| L8 | R13 = 244.236 | 3.347 | 1.847 | 23.8 |
|    | R14 = −159.720 | 0.200 | | |
| L9 | R15 = 37.449 | 7.464 | 1.487 | 70.4 |
|    | R16 = −59.792 | 1.500 | 1.847 | 23.8 |
| L10 | R17 = 128.574 | 14.245 | | |
|     | R18 = 34.377 | | | |
| L11 |              | 7.312 | 1.694 | 53.3 |

-continued

| Element | Radius of Curvature (mm) | Axial Distance Between Surfaces (mm) | Index of Refraction $N_d$ | Abbe No. $V_d$ |
|---|---|---|---|---|
| | R19 = 125.375 | | | |
| | | 12.722 | | |
| | R20 = 40.777 | | | |
| L12 | | 1.500 | 1.834 | 37.3 |
| | R21 = 17.194 | | | |
| L13 | | 8.377 | 1.529 | 51.6 |
| | R22 = −45.367 | | | |
| | | 4.500 | | |
| | R23 = −23.943 | | | |
| L14 | | 1.500 | 1.850 | 32.2 |
| | R24 = 50.260 | | | |
| | | 0.724 | | |
| | R25 = 56.060 | | | |
| L15 | | 3.971 | 1.847 | 23.8 |
| | R26 = −75.126 | | | |

Where L1-L15 are lens elements from the object end to the image end successively. R1-R26 are the radii of the element surfaces successively from the object to image end. $N_d$ is the index of refraction of the elements, and $V_d$ is the dispersion of the elements as measured by the Abbe number.

27. A lens according to claim 1 having semi-field angles of 22.8° to 6.3° as scaled to a 24×36 mm image frame defined substantially as follows:

| Element | Radius of Curvature (mm) | Axial Distance Between Surfaces (mm) | Index of Refraction $N_d$ | Abbe No. $V_d$ |
|---|---|---|---|---|
| | R1 = 51.685 | | | |
| L1 | | 2.000 | 1.728 | 28.7 |
| | R2 = 35.419 | | | |
| L2 | | 11.322 | 1.487 | 70.4 |
| | R3 = −300.792 | | | |
| | | 0.200 | | |
| | R4 = 70.392 | | | |
| L3 | | 4.236 | 1.487 | 70.4 |
| | R5 = 260.451 | | | |
| | | 2.174 | | |
| | R6 = −218.893 | | | |
| L4 | | 1.500 | 1.773 | 49.6 |
| | R7 = 33.369 | | | |
| | | 5.032 | | |
| | R8 = −50.332 | | | |
| L5 | | 1.500 | 1.697 | 55.5 |
| | R9 = 29.315 | | | |
| L6 | | 5.544 | 1.847 | 23.8 |
| | R10 = 372.944 | | | |
| | | 39.191 | | |
| | R11 = 278.949 | | | |
| L7 | | 3.349 | 1.785 | 25.7 |
| | R12 = −112.134 | | | |
| | | 0.200 | | |
| | R13 = 37.648 | | | |
| L8 | | 8.126 | 1.487 | 70.4 |
| | R14 = −46.741 | | | |
| L9 | | 1.500 | 1.728 | 28.7 |
| | R15 = 130.107 | | | |
| | | 12.937 | | |
| | R16 = 30.554 | | | |
| L10 | | 5.344 | 1.589 | 61.3 |
| | R17 = 161.993 | | | |
| | | 9.765 | | |
| | R18 = 53.104 | | | |
| L11 | | 1.500 | 1.805 | 25.5 |
| | R19 = 26.732 | | | |
| | | 0.998 | | |
| | R20 = 35.956 | | | |
| L12 | | 4.621 | 1.603 | 60.7 |
| | R21 = −86.528 | | | |
| | | 10.000 | | |
| | R22 = −20.688 | | | |
| L13 | | 1.200 | 1.773 | 49.6 |
| | R23 = 36.746 | | | |
| L14 | | 6.262 | 1.673 | 32.2 |
| | R24 = −36.746 | | | |

Where L1-L14 are lens elements from the object end to the image end successively. R1-R24 are the radii of the element surfaces successively from the object to image end. $N_d$ is the index of refraction of the elements, and $V_d$ is the dispersion of the elements as measured by the Abbe number.

28. A lens according to claim 1 having semi-field angles of 22.8° to 6.3° as scaled to a 24×36 mm image frame defined substantially as follows:

| Element | Radius of Curvature (mm) | Axial Distance Between Surfaces (mm) | Index of Refraction $N_d$ | Abbe No. $V_d$ |
|---|---|---|---|---|
| | R1 = 101.687 | | | |
| L1 | | 7.471 | 1.487 | 70.4 |
| | R2 = −198.419 | | | |
| | | 0.200 | | |
| | R3 = 95.447 | | | |
| L2 | | 7.353 | 1.487 | 70.4 |
| | R4 = −139.520 | | | |
| L3 | | 2.000 | 1.805 | 25.5 |
| | R5 = −5325.160 | | | |
| | | 2.883 | | |
| | R6 = −190.880 | | | |
| L4 | | 1.500 | 1.773 | 49.7 |
| | R7 = 48.001 | | | |
| | | 5.742 | | |
| | R8 = −58.215 | | | |
| L5 | | 2.000 | 1.697 | 55.5 |
| | R9 = 42.255 | | | |
| L6 | | 4.992 | 1.847 | 23.8 |
| | R10 = 2180.742 | | | |
| | | 50.035 | | |
| | R11 = 154.385 | | | |
| L7 | | 3.104 | 1.847 | 23.8 |
| | R12 = −536.964 | | | |
| | | 0.200 | | |
| | R13 = 34.221 | | | |
| L8 | | 8.851 | 1.487 | 70.4 |
| | R14 = −42.312 | | | |
| L9 | | 1.500 | 1.805 | 25.5 |
| | R15 = 124.660 | | | |
| | | 5.006 | | |
| | R16 = 27.114 | | | |
| L10 | | 5.691 | 1.581 | 40.9 |
| | R17 = 167.817 | | | |
| | | 6.077 | | |
| | R18 = 35.204 | | | |
| L11 | | 1.500 | 1.847 | 23.8 |
| | R19 = 22.920 | | | |
| | | 1.620 | | |
| | R20 = 36.325 | | | |
| L12 | | 6.578 | 1.541 | 47.2 |
| | R21 = −83.500 | | | |
| | | 8.928 | | |
| | R22 = −18.143 | | | |
| L13 | | 1.500 | 1.834 | 37.3 |
| | R23 = 114.343 | | | |
| | | 0.617 | | |
| | R24 = 278.786 | | | |
| L14 | | 3.152 | 1.847 | 23.8 |
| | R25 = −35.211 | | | |

Where L1-L14 are lens elements from the object end to the image end successively. R1-R25 are the radii of the element surfaces successively from the object to image end. $N_d$ is the index of refraction of the elements, and $V_d$ is the dispersion of the elements as measured by the Abbe number.

29. A lens according to claim 1 having semi-field angles of 22.8° to 6.3° as scaled to a 24×36 mm image frame defined substantially as follows:

| Element | Radius of Curvature (mm) | Axial Distance Between Surfaces (mm) | Index of Refraction $N_d$ | Abbe No. $V_d$ |
|---|---|---|---|---|
| L1 | R1 = 100.000 | | | |
| | R2 = 61.777 | 2.000 | 1.847 | 23.8 |
| L2 | | 8.540 | 1.487 | 70.4 |
| | R3 = −139.015 | 0.200 | | |
| L3 | R4 = 57.007 | 4.333 | 1.487 | 70.4 |
| | R5 = 141.831 | 1.774 | | |
| L4 | R6 = −219.606 | 1.500 | 1.773 | 49.7 |
| | R7 = 42.712 | 4.608 | | |
| L5 | R8 = −50.056 | 2.000 | 1.697 | 55.5 |
| | R9 = 39.784 | | | |
| L6 | | 4.992 | 1.847 | 23.8 |
| | R10 = −1453.300 | 47.246 | | |
| L7 | R11 = 93.289 | 3.836 | 1.805 | 25.5 |
| | R12 = −218.835 | 0.200 | | |
| L8 | R13 = 37.170 | 7.645 | 1.487 | 70.4 |
| | R15 = −60.263 | | | |
| L9 | | 1.500 | 1.847 | 23.8 |
| | R15 = 74.160 | 8.989 | | |
| L10 | R16 = 28.233 | 5.691 | 1.583 | 45.7 |
| | R17 = 161.805 | 8.196 | | |
| L11 | R18 = 41.946 | 1.500 | 1.847 | 23.8 |
| | R19 = 23.983 | 1.133 | | |
| L12 | R20 = 33.166 | 4.571 | 1.532 | 48.8 |
| | R21 = −115.744 | 11.000 | | |
| L13 | R22 = −18.977 | 1.500 | 1.834 | 37.3 |
| | R23 = 73.633 | 0.505 | | |
| L14 | R24 = 94.636 | 5.041 | 1.785 | 25.7 |
| | R25 = −31.880 | | | |

Where L1–L14 are lens elements from the object end to the image end successively. R1–R25 are the radii of the element surfaces successively from the object to image end. $N_d$ is the index of refraction of the elements, and $V_d$ is the dispersion of the elements as measured by the Abbe number.

30. A lens according to claim 1 having semi-field angles of 22.8° to 6.3° as scaled to a 24×36 mm image frame defined substantially as follows:

| Element | Radius of Curvature (mm) | Axial Distance Between Surfaces (mm) | Index of Refraction $N_d$ | Abbe No. $V_d$ |
|---|---|---|---|---|
| L1 | R1 = 94.324 | 6.157 | 1.517 | 69.7 |
| | R2 = −225.278 | 0.200 | | |
| L2 | R3 = 107.461 | 6.256 | 1.487 | 70.4 |
| L3 | R5 = −125.129 | 2.000 | 1.847 | 23.8 |
| | R5 = −998.950 | 1.000 | | |
| L4 | R6 = −175.603 | 1.500 | 1.713 | 53.9 |
| | R7 = 42.006 | 4.571 | | |
| | R8 = −55.596 | | | |
| L5 | | 2.000 | 1.697 | 55.5 |
| | R9 = 38.480 | | | |
| L6 | | 4.988 | 1.847 | 23.8 |
| | R10 = −2603.400 | 46.933 | | |
| L7 | R11 = 57.230 | 5.338 | 1.607 | 56.7 |
| | R12 = −355.668 | 0.200 | | |
| L8 | R13 = 97.881 | 7.895 | 1.581 | 40.9 |
| | R15 = −38.031 | | | |
| L9 | | 1.500 | 1.847 | 23.8 |
| | R15 = 383.703 | 10.275 | | |
| L10 | R16 = 26.072 | 8.076 | 1.517 | 69.7 |
| | R17 = 264.855 | 11.774 | | |
| L11 | R18 = 57.188 | 2.581 | 1.487 | 70.4 |
| | R19 = 157.667 | 0.588 | | |
| L12 | R20 = 132.141 | 1.500 | 1.786 | 43.9 |
| | R21 = 17.553 | 0.559 | | |
| L13 | R22 = 18.852 | 6.418 | 1.648 | 33.8 |
| | R23 = −54.308 | 2.694 | | |
| L14 | R24 = −20.096 | 1.500 | 1.800 | 42.3 |
| | R25 = −96.886 | | | |

Where L1–L14 are lens elements from the object end to the image end successively. R1–R25 are the radii of the element surfaces successively from the object to image end. $N_d$ is the index of refraction of the elements, and $V_d$ is the dispersion of the elements as measured by the Abbe number.

31. A lens according to claim 1 having semi-field angles of 22.8° to 8.2° as scaled to a 24×36 mm image frame defined substantially as follows:

| Element | Radius of Curvature (mm) | Axial Distance Between Surfaces (mm) | Index of Refraction $N_d$ | Abbe No. $V_d$ |
|---|---|---|---|---|
| L1 | R1 = 43.818 | 2.00 | 1.805 | 25.5 |
| | R2 = 30.325 | | | |
| L2 | | 9.03 | 1.487 | 70.4 |
| | R3 = 660.800 | 0.20 | | |
| L3 | R4 = 57.757 | 4.58 | 1.487 | 70.4 |
| | R5 = −2198.63 | 2.00 | | |
| L4 | R6 = −172.476 | 1.50 | 1.786 | 43.9 |
| | R7 = 23.666 | 4.44 | | |
| | R8 = −37.599 | | | |
| L5 | | 1.50 | 1.487 | 70.4 |
| L6 | R9 = 27.572 | 4.19 | 1.847 | 23.8 |
| | R10 = 215.640 | .88 | | |
| L7 | R11 = 58.063 | 2.76 | 1.785 | 25.7 |
| | R12 = 451.184 | .20 | | |
| L8 | R13 = 40.879 | 6.43 | 1.487 | 70.4 |
| | R14 = −30.890 | | | |
| L9 | | 1.50 | 1.805 | 25.3 |
| | R15 = 179.032 | 4.64 | | |

-continued

| Element | Radius of Curvature (mm) | Axial Distance Between Surfaces (mm) | Index of Refraction $N_d$ | Abbe No. $V_d$ |
|---|---|---|---|---|
| | R16 = 26.196 | | | |
| L10 | | 5.72 | 1.487 | 70.4 |
| | R17 = −122.438 | | | |
| | | 11.13 | | |
| | R18 = 54.654 | | | |
| L11 | | 1.50 | 1.834 | 37.3 |
| | R19 = 17.104 | | | |
| | | 0.37 | | |
| | R20 = 17.908 | | | |
| L12 | | 5.14 | 1.626 | 35.5 |
| | R21 = −77.945 | | | |
| | | 5.29 | | |
| | R22 = −17.046 | | | |
| L13 | | 1.50 | 1.743 | 49.2 |
| | R23 = 40.228 | | | |

Where L1–L13 are lens elements from the object end to the image end successively. R1–R23 are the radii of the element surfaces successively from the object to image end. $N_d$ is the index of refraction of the elements, and $V_d$ is the dispersion of the elements as measured by the Abbe number.

32. A lens according to claim 1 having semi-field angles of 29.6° to 8.4° as scaled to a 24×36 mm image frame defined substantially as follows:

| Element | Radius of Curvature (mm) | Axial Distance Between Surfaces (mm) | Index of Refraction $N_d$ | Abbe No. $V_d$ |
|---|---|---|---|---|
| | R1 = 84.075 | | | |
| L1 | | 2.000 | 1.824 | 32.4 |
| | R2 = 35.070 | | | |
| L2 | | 10.644 | 1.487 | 70.4 |
| | R3 = Infinity | | | |
| | | 0.200 | | |
| | R4 = 42.216 | | | |
| L3 | | 7.293 | 1.640 | 60.2 |
| | R5 = −551.202 | | | |
| | | 1.417 | | |
| | R6 = 3577.318 | | | |
| L4 | | 1.500 | 1.773 | 49.6 |
| | R7 = 22.455 | | | |
| | | 4.403 | | |
| | R8 = −36.651 | | | |
| L5 | | 1.500 | 1.697 | 55.5 |
| | R9 = 23.130 | | | |
| L6 | | 4.494 | 1.847 | 23.8 |
| | R10 = 305.162 | | | |
| | | 27.789 | | |
| | R11 = 182.035 | | | |
| L7 | | 3.349 | 1.805 | 25.5 |
| | R12 = −83.526 | | | |
| | | .200 | | |
| | R13 = 31.013 | | | |
| L8 | | 6.560 | 1.487 | 70.4 |
| | R14 = −39.407 | | | |
| L9 | | 1.500 | 1.789 | 27.5 |
| | R15 = 83.438 | | | |
| | | 19.239 | | |
| | R16 = 24.898 | | | |
| L10 | | 5.344 | 1.592 | 60.5 |
| | R17 = 131.219 | | | |
| | | 4.888 | | |
| | R18 = 51.764 | | | |
| L11 | | 1.500 | 1.805 | 25.5 |
| | R19 = 22.511 | | | |
| | | 1.477 | | |
| | R20 = 32.129 | | | |
| L12 | | 6.196 | 1.599 | 62.1 |
| | R21 = −44.403 | | | |
| | | 6.00 | | |
| | R22 = −18.935 | | | |
| L13 | | 1.200 | 1.764 | 47.9 |
| | R23 = 31.004 | | | |
| L14 | | 7.807 | 1.692 | 36.9 |
| | R24 = −31.715 | | | |

Where L1–L14 are lens elements from the object end to the image end successively. R1–R24 are the radii of the element surfaces successively from the object to image end. $N_d$ is the index of refraction of the elements, and $V_d$ is the dispersion of the elements as measured by the Abbe number.

33. A lens according to claim 1 having semi-field angles of 22.8° to 8.5° as scaled to a 24×36 mm image frame defined substantially as follows:

| Element | Radius of Curvature (mm) | Axial Distance Between Surfaces (mm) | Index of Refraction $N_d$ | Abbe No. $V_d$ |
|---|---|---|---|---|
| | R1 = 154.274 | | | |
| L1 | | 2.000 | 1.805 | 25.5 |
| | R2 = 60.625 | | | |
| L2 | | 7.482 | 1.603 | 60.7 |
| | R3 = −166.752 | | | |
| | | 0.200 | | |
| | R4 = 49.425 | | | |
| L3 | | 4.711 | 1.487 | 70.4 |
| | R5 = 976.009 | | | |
| | | 2.000 | | |
| | R6 = −111.965 | | | |
| L4 | | 1.500 | 1.834 | 37.3 |
| | R7 = 29.937 | | | |
| | | 4.683 | | |
| | R8 = −40.282 | | | |
| L5 | | 1.500 | 1.487 | 70.4 |
| | R9 = 34.267 | | | |
| L6 | | 4.190 | 1.847 | 23.8 |
| | R10 = −661.409 | | | |
| | | 37.179 | | |
| | R11 = 58.780 | | | |
| L7 | | 3.370 | 1.785 | 25.7 |
| | R12 = 588.325 | | | |
| | | 0.200 | | |
| | R13 = 40.593 | | | |
| L8 | | 6.062 | 1.518 | 59.0 |
| | R14 = −38.790 | | | |
| L9 | | 1.500 | 1.805 | 25.5 |
| | R15 = 60.207 | | | |
| | | 0.200 | | |
| | R16 = 29.884 | | | |
| L10 | | 4.661 | 1.603 | 60.7 |
| | R17 = Infinity | | | |
| | | 15.024 | | |
| | R18 = 47.488 | | | |
| L11 | | 1.500 | 1.834 | 37.3 |
| | R19 = 17.934 | | | |
| | | 0.309 | | |
| | R20 = 18.509 | | | |
| L12 | | 5.462 | 1.632 | 34.8 |
| | R21 = −62.404 | | | |
| | | 6.267 | | |
| | R22 = −19.946 | | | |
| L13 | | 1.500 | 1.834 | 37.3 |
| | R23 = −58.480 | | | |

Where L1–L13 are lens elements from the object end to the image end successively. R1–R23 are the radii of the element surfaces successively from the object to image end. $N_d$ is the index of refraction of the elements, and $V_d$ is the dispersion of the elements as measured by the Abbe number.

34. A lens according to claim 1 having semi-field angles of 22.7° to 6.4° as scaled to a 24×36 mm image frame defined substantially as follows:

| Element | Radius of Curvature (mm) | Axial Distance Between Surfaces (mm) | Index of Refraction $N_d$ | Abbe No. $V_d$ |
|---|---|---|---|---|
| | R1 = 61.614 | | | |
| L1 | | 3.000 | 1.805 | 25.5 |
| | R2 = 43.179 | | | |

-continued

| Element | Radius of Curvature (mm) | Axial Distance Between Surfaces (mm) | Index of Refraction $N_d$ | Abbe No. $V_d$ |
|---|---|---|---|---|
| L2 | | 11.800 | 1.487 | 70.4 |
| | R3 = −262.146 | 0.200 | | |
| L3 | R4 = 57.758 | 3.500 | 1.487 | 70.4 |
| | R5 = 84.442 | 32.117 | | |
| L4 | R6 = −1317.271 | 1.500 | 1.804 | 46.5 |
| | R7 = 36.278 | 5.516 | | |
| L5 | R8 = −44.483 | 1.500 | 1.773 | 49.6 |
| | R9 = 34.734 | | | |
| L6 | R10 = −219.127 | 5.000 | 1.847 | 23.8 |
| | R11 = 234.035 | 3.250 | | |
| L7 | R12 = −89.453 | 3.350 | 1.699 | 30.1 |
| | R13 = 43.887 | 0.200 | | |
| L8 | R14 = −58.165 | 6.600 | 1.487 | 70.4 |
| L9 | R15 = 117.280 | 1.500 | 1.785 | 26.1 |
| | R16 = 43.796 | 1.000 | | |
| L10 | R17 = 1423.188 | 4.200 | 1.487 | 70.4 |
| | R18 = 25.838 | 0.200 | | |
| L11 | R19 = 64.901 | 5.600 | 1.487 | 70.4 |
| | R20 = 27.729 | 4.495 | | |
| L12 | R21 = 18.696 | 2.000 | 1.805 | 25.5 |
| | R22 = 72.878 | 8.570 | | |
| L13 | R23 = −31.396 | 4.900 | 1.487 | 70.4 |
| | R24 = −23.175 | 2.125 | | |
| L14 | R25 = 43.273 | 1.200 | 1.804 | 46.5 |
| | R26 = 46.400 | 0.571 | | |
| L15 | R27 = −124.368 | 3.900 | 1.805 | 25.5 |

Where L1–L15 are lens elements from the object end to the image end successively. R1–R27 are the radii of the element surfaces successively from the object to image end. $N_d$ is the index of refraction of the elements, and $V_d$ is the dispersion of the elements as measured by the Abbe number.

35. A lens according to claim 1 having semi-field angles of 22.8° to 6.4° as scaled to a 24×36 mm image frame defined substantially as follows:

| Element | Radius of Curvature (mm) | Axial Distance Between Surfaces (mm) | Index of Refraction $N_d$ | Abbe No. $V_d$ |
|---|---|---|---|---|
| L1 | R1 = 76.881 | 3.000 | 1.805 | 25.5 |
| L2 | R2 = 48.966 | 12.250 | 1.487 | 70.4 |
| | R3 = −164.561 | | | |

-continued

| Element | Radius of Curvature (mm) | Axial Distance Between Surfaces (mm) | Index of Refraction $N_d$ | Abbe No. $V_d$ |
|---|---|---|---|---|
| | | 0.210 | | |
| | R4 = 45.744 | | | |
| L3 | R5 = 64.414 | 3.500 | 1.517 | 64.2 |
| | R6 = 230.226 | 30.449 | | |
| L4 | R7 = 32.025 | 1.500 | 1.713 | 53.9 |
| | R8 = −39.590 | 5.200 | | |
| L5 | R9 = 36.704 | 1.500 | 1.773 | 49.6 |
| L6 | R10 = −235.177 | 5.000 | 1.847 | 23.8 |
| | R11 = −166.537 | 3.750 | | |
| L7 | R12 = −72.127 | 2.800 | 1.785 | 26.1 |
| | R13 = 46.928 | 0.200 | | |
| L8 | R14 = −50.494 | 7.300 | 1.487 | 70.4 |
| L9 | R15 = 526.365 | 1.500 | 1.785 | 26.1 |
| | R16 = 64.334 | 1.010 | | |
| L10 | R17 = −211.416 | 4.200 | 1.487 | 70.4 |
| | R18 = 29.665 | 0.200 | | |
| L11 | R19 = 76.428 | 5.450 | 1.487 | 70.4 |
| | R20 = 26.516 | 9.370 | | |
| L12 | R21 = 19.733 | 2.000 | 1.847 | 23.8 |
| | R22 = 64.036 | 6.680 | | |
| L13 | R23 = −30.409 | 5.200 | 1.487 | 70.4 |
| | R24 = −25.289 | 1.280 | | |
| L14 | R25 = 52.130 | 1.200 | 1.804 | 46.5 |
| | R26 = 62.262 | 3.230 | | |
| L15 | R27 = −189.602 | 4.280 | 1.805 | 25.5 |

Where L1–L15 are lens elements from the object end to the image end successively. R1–R27 are the radii of the element surfaces successively from the object to image end. $N_d$ is the index of refraction of the elements, and $V_d$ is the dispersion of the elements as measured by the Abbe number.

36. The lens of claim 1 wherein:

$0.3 \leq fI/FVD \leq 0.6$ $0.10 \leq |fII/FVD| \leq 0.25$ $0.3 \leq fIIIa/FVD \leq 1.2$ $0.3 \leq fIIIb/FVD \leq 0.6$ Where fI is the effective focal length of said first grouping, fII is the equivalent focal length of said second grouping, fIIIa is the equivalent focal length of said front sub-grouping, fIIIb is the equivalent focal length of said rear sub-grouping, and FVD is the front vertex distance of the lens.

37. The lens of claim 1 wherein the telephoto ratio of said rear sub-grouping is less than 1.

* * * * *

UNITED STATES PATENT AND TRADEMARK OFFICE
CERTIFICATE OF CORRECTION

PATENT NO. : 4,462,664
DATED : July 31, 1984
INVENTOR(S) : JACOB MOSKOVICH

It is certified that error appears in the above-identified patent and that said Letters Patent are hereby corrected as shown below:

Column 18, Table XXVIII, in the Heading of 9th column within the table, change "Ratio to -- Zoom Ratio" Ratio --.

Column 20, Line 26, change "$0.10 \leq |f_{II/FVD}| \ 23 \ 0.25$" to

-- $0.10 \leq |f_{II/FVD}| \ 0.25$ --.

Column 21, Claim 7, correct the expression "$\dfrac{f_{IIIa}}{f_I} \geq .9$"

to -- $\dfrac{f_{IIIa}}{f_I} \geq .9$ --

UNITED STATES PATENT AND TRADEMARK OFFICE
CERTIFICATE OF CORRECTION

PATENT NO. : 4,462,664
DATED : July 31, 1984
INVENTOR(S) : JACOB MOSKOVICH

It is certified that error appears in the above-identified patent and that said Letters Patent are hereby corrected as shown below:

Column 21, Claim 8, correct the expression $"2.5 > \frac{f_{IIIa}}{f_I} \geq .9"$ to -- $2.5 > \frac{f_{IIIa}}{f_I} \geq .9$ --

Signed and Sealed this

First Day of January 1985

[SEAL]

Attest:

Attesting Officer

GERALD J. MOSSINGHOFF

Commissioner of Patents and Trademarks